US010940389B1

(12) United States Patent
Cerny et al.

(10) Patent No.: US 10,940,389 B1
(45) Date of Patent: Mar. 9, 2021

(54) SYNCHRONIZATION AND OFFSET OF VSYNC BETWEEN CLOUD GAMING SERVER AND CLIENT

(71) Applicant: Sony Interactive Entertainment Inc., Tokyo (JP)

(72) Inventors: Mark E. Cerny, Los Angeles, CA (US); Kelvin M. Yong, Irvine, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/696,040

(22) Filed: Nov. 26, 2019

Related U.S. Application Data

(60) Provisional application No. 62/909,118, filed on Oct. 1, 2019, provisional application No. 62/909,132, filed on Oct. 1, 2019, provisional application No. 62/909,142, filed on Oct. 1, 2019, provisional application No. 62/909,152, filed on Oct. 1, 2019.

(51) Int. Cl.

| | |
|---|---|
| ***A63F 13/358*** | (2014.01) |
| ***H04N 21/242*** | (2011.01) |
| ***H04N 21/43*** | (2011.01) |
| ***H04N 21/4402*** | (2011.01) |
| ***H04N 21/442*** | (2011.01) |
| ***A63F 13/44*** | (2014.01) |
| ***H04N 21/8547*** | (2011.01) |

(52) U.S. Cl.
CPC ............ *A63F 13/358* (2014.09); *A63F 13/44* (2014.09); *H04N 21/242* (2013.01); *H04N 21/4302* (2013.01); *H04N 21/4402* (2013.01); *H04N 21/4424* (2013.01); *H04N 21/8547* (2013.01); *A63F 2300/534* (2013.01); *A63F 2300/638* (2013.01)

(58) Field of Classification Search
USPC ............ 463/42
See application file for complete search history.

(56) References Cited

U.S. PATENT DOCUMENTS

| | | | | |
|---|---|---|---|---|
| 9,691,181 | B2 * | 6/2017 | Watson | G06T 19/20 |
| 2017/0087464 | A1 * | 3/2017 | Perry | A63F 13/497 |
| 2017/0293459 | A1 * | 10/2017 | Watson | G06T 19/20 |
| 2019/0217191 | A1 * | 7/2019 | Colenbrander | A63F 13/355 |
| 2020/0206614 | A1 * | 7/2020 | Colenbrander | H04L 67/141 |
| 2020/0206619 | A1 * | 7/2020 | van der Laan | H04N 19/61 |

* cited by examiner

*Primary Examiner* — Pierre E Elisca
(74) *Attorney, Agent, or Firm* — Penilla IP, APC

(57) ABSTRACT

A method is disclosed including setting, at a server, a server VSYNC signal to a server VSYNC frequency. The server VSYNC signal corresponding to generation of video frames during frame periods for the server VSYNC frequency. The method including setting, at a client, a client VSYNC signal to a client VSYNC frequency. The method including sending compressed video frames from the server to the client over a network using the server VSYNC signal, wherein the compressed video frames are based on the generated video frames. The method including decoding and displaying, at the client, the compressed video frames. The method including analyzing the timing of one or more client operations to adjust the relative timing between the server VSYNC signal and the client VSYNC signal, as the client receives the compressed video frames.

31 Claims, 19 Drawing Sheets

200A

800B

SYNCHRONIZATION AND OFFSET OF VSYNC BETWEEN CLOUD GAMING SERVER AND CLIENT

CLAIM OF PRIORITY

This application claims priority to and the benefit of U.S. Provisional App. Ser. No. 62/909,118 filed on Oct. 1, 2019, entitled "Synchronization And Offset Of VSYNC Between Cloud Gaming Server and Client," the disclosure of which is incorporated herein by reference in its entirety for all purposes. This application claims priority to and the benefit of U.S. Provisional App. Ser. No. 62/909,132 filed on Oct. 1, 2019, entitled "Dynamic Client Buffering And Usage Of Received Video Frames For Cloud Gaming," the disclosure of which is incorporated herein by reference in its entirety for all purposes. This application claims priority to and the benefit of U.S. Provisional App. Ser. No. 62/909,142 filed on Oct. 1, 2019, entitled "Synchronization And Offset Of VSYNC Between Gaming Devices," the disclosure of which is incorporated herein by reference in its entirety for all purposes. This application claims priority to and the benefit of U.S. Provisional App. Ser. No. 62/909,152 filed on Oct. 1, 2019, entitled "Reducing Latency In Cloud Gaming Applications By Overlapping Reception and Decoding Of Video Frames And Their Display," the disclosure of which is incorporated herein by reference in its entirety for all purposes.

TECHNICAL FIELD

The present disclosure is related to streaming systems configured for streaming content across a network, and more specifically to synchronizing vertical synchronization (VSYNC) signals between a cloud gaming server and a client for reducing latency between the cloud gaming server and the client.

BACKGROUND OF THE DISCLOSURE

In recent years there has been a continual push for online services that allow for online or cloud gaming in a streaming format between a cloud gaming server and a client connected through a network. The streaming format has increasingly become more popular because of the availability of game titles on demand, the ability to network between players for multi-player gaming, sharing of assets between players, sharing of instant experiences between players and/or spectators, allowing friends to watch a friend play a video game, having a friend join the on-going game play of a friend, and the like. Unfortunately, the demand is also pushing up against limits of the capabilities of network connections and the processing performed at the server and the client that is responsive enough to render high quality images as delivered to the client. For example, results of all gaming activities that are performed on the server need to be compressed and transmitted back to the client at low millisecond latency for the best user experience. Round-trip latency may be defined as the overall time between the user's controller input and the display of the video frames at the client; it may include processing and transmission of the control information from controller to client, processing and transmission of the control information from client to server, usage of that input at the server to generate a video frame responsive to the input, processing and transfer of the video frame to the encoding unit (e.g. scan-out), encode of the video frame, transmission of the encoded video frame back to the client, reception and decoding of the video frame, and any processing or staging of the video frame prior to its display. One-way latency may be defined as being the part of the round-trip latency consisting of the time from beginning of transfer of the video frame to the encoding unit (e.g. scan-out) at the server to the beginning of display of video frame at the client. A portion of the round-trip and one-way latency is associated with time taken for the data streams to be sent from client to server and server to client over a communications network. Another portion is associated with processing at client and server; improvements in these operations, such as advanced strategies related to frame decoding and display, can result in substantially reduced round-trip and one-way latency between the server and the client and provide a higher quality experience to users of cloud gaming services.

It is in this context that embodiments of the disclosure arise.

SUMMARY

Embodiments of the present disclosure relate to streaming systems configured for streaming content (e.g., gaming) across a network, and more specifically to synchronizing VSYNC signals between a cloud gaming server and a client for purposes of reducing latency between the cloud gaming server and the client. In the context of this patent, "synchronize" should be taken to mean tuning the signals so that their frequencies match, but phase may differ; "offset" should be taken to mean the time delay between the signals, e.g. the time between when one signal reaches its maximum and the other signal reaches its maximum.

Embodiments of the present disclosure disclose a method. The method including setting, at a server, a server VSYNC signal to a server VSYNC frequency, the server VSYNC signal corresponding to generation of a plurality of video frames at the server during a plurality of frame periods for the server VSYNC frequency. The method including setting, at a client, a client VSYNC signal to a client VSYNC frequency. The method including sending a plurality of compressed video frames based on the plurality of video frames from the server to the client over a network using the server VSYNC signal. The method including decoding and displaying, at the client, the plurality of compressed video frames. The method including as the client receives the plurality of compressed video frames, analyzing the timing of one or more client operations to adjust the relative timing between the server VSYNC signal and the client VSYNC signal.

Other embodiments of the present disclosure disclose a method. The method including generating a plurality of video frames at the server during a plurality of frame periods where the frame periods are approximately equal in size. The method including setting, at a client, a client VSYNC signal to a client VSYNC frequency. The method including sending a plurality of compressed video frames based on the plurality of video frames from the server to the client. The method including decoding and displaying, at the client, the plurality of compressed video frames. The method including as the client receives the plurality of compressed video frames, analyzing the timing of one or more client operations to adjust the relative timing of the client VSYNC signal and the generation of the plurality of compressed video frames at the server.

Other embodiments of the present disclosure disclose a non-transitory computer-readable medium storing a computer program for performing a method. The computer-readable medium including program instructions for setting, at a server, a server VSYNC signal to a server VSYNC frequency, the server VSYNC signal corresponding to generation of a plurality of video frames at the server during a plurality of frame periods for the server VSYNC frequency. The computer-readable medium including program instructions for setting, at a client, a client VSYNC signal to a client VSYNC frequency. The computer-readable medium including program instructions for sending a plurality of compressed video frames based on the plurality of video frames from the server to the client over a network using the server VSYNC signal. The computer-readable medium including program instructions for decoding and displaying, at the client, the plurality of compressed video frames. The computer-readable medium including program instructions for analyzing the timing of one or more client operations to adjust the relative timing between the server VSYNC signal and the client VSYNC signal, as the client receives the plurality of compressed video frames.

Other embodiments of the present disclosure disclose a computer system that includes a processor, and memory coupled to the processor and having stored therein instructions that, if executed by the computer system, cause the computer system to execute a method. The method including setting, at a server, a server VSYNC signal to a server VSYNC frequency, the server VSYNC signal corresponding to generation of a plurality of video frames at the server during a plurality of frame periods for the server VSYNC frequency. The method including setting, at a client, a client VSYNC signal to a client VSYNC frequency. The method including sending a plurality of compressed video frames based on the plurality of video frames from the server to the client over a network using the server VSYNC signal. The method including decoding and displaying, at the client, the plurality of compressed video frames. The method including as the client receives the plurality of compressed video frames, analyzing the timing of one or more client operations to adjust the relative timing between the server VSYNC signal and the client VSYNC signal.

Other embodiments of the present disclosure disclose another method. The method including setting, at a server, a server VSYNC signal to a server VSYNC frequency defining a plurality of frame periods, the server VSYNC signal corresponding to generation of a plurality of video frames at the server during the plurality of frame periods. The method including setting, at a client, a client VSYNC signal to a client VSYNC frequency. The method including sending a plurality of compressed video frames based on the plurality of video frames from the server to the client over a network using the server VSYNC signal. The method including decoding and displaying, at the client, the plurality of compressed video frames. The method including as the client receives the plurality of compressed video frames, analyzing the timing of one or more client operations to set the amount of frame buffering used by the client.

Other embodiments of the present disclosure disclose a non-transitory computer-readable medium storing a computer program for performing a method. The computer-readable medium including program instructions for setting, at a server, a server VSYNC signal to a server VSYNC frequency defining a plurality of frame periods, the server VSYNC signal corresponding to generation of a plurality of video frames at the server during the plurality of frame periods. The computer-readable medium including program instructions for setting, at a client, a client VSYNC signal to a client VSYNC frequency. The computer-readable medium including program instructions for sending a plurality of compressed video frames based on the plurality of video frames from the server to the client over a network using the server VSYNC signal. The computer-readable medium including program instructions for decoding and displaying, at the client, the plurality of compressed video frames. The computer-readable medium including program instructions for analyzing the timing of one or more client operations to set the amount of frame buffering used by the client, as the client receives the plurality of compressed video frames.

Other embodiments of the present disclosure disclose a computer system that includes a processor, and memory coupled to the processor and having stored therein instructions that, if executed by the computer system, cause the computer system to execute a method. The method including setting, at a server, a server VSYNC signal to a server VSYNC frequency defining a plurality of frame periods, the server VSYNC signal corresponding to generation of a plurality of video frames at the server during the plurality of frame periods. The method including setting, at a client, a client VSYNC signal to a client VSYNC frequency. The method including sending a plurality of compressed video frames based on the plurality of video frames from the server to the client over a network using the server VSYNC signal. The method including decoding and displaying, at the client, the plurality of compressed video frames. The method including as the client receives the plurality of compressed video frames, analyzing the timing of one or more client operations to set the amount of frame buffering used by the client.

Other embodiments of the present disclosure disclose another method. The method including setting, at a plurality of devices, a plurality of VSYNC signals to a plurality of VSYNC frequencies, wherein a corresponding device VSYNC signal of a corresponding device is set to a corresponding device VSYNC frequency. The method including sending a plurality of signals between the plurality of devices, which are analyzed and used to adjust the relative timing between corresponding device VSYNC signals of at least two devices.

Other embodiments of the present disclosure disclose a non-transitory computer-readable medium storing a computer program for performing a method. The computer-readable medium including program instructions for setting, at a plurality of devices, a plurality of VSYNC signals to a plurality of VSYNC frequencies, wherein a corresponding device VSYNC signal of a corresponding device is set to a corresponding device VSYNC frequency. The computer-readable medium including program instructions for sending a plurality of signals between the plurality of devices, which are analyzed and used to adjust the relative timing between corresponding device VSYNC signals of at least two devices.

Other embodiments of the present disclosure disclose a computer system that includes a processor, and memory coupled to the processor and having stored therein instructions that, if executed by the computer system, cause the computer system to execute a method. The method including setting, at a plurality of devices, a plurality of VSYNC signals to a plurality of VSYNC frequencies, wherein a corresponding device VSYNC signal of a corresponding device is set to a corresponding device VSYNC frequency. The method including sending a plurality of signals between the plurality of devices, which are analyzed and used to adjust the relative timing between corresponding device VSYNC signals of at least two devices.

Other embodiments of the present disclosure disclose another method. The method including receiving an encoded video frame at a client, wherein a server executes an application to generate a rendered video frame which is then encoded at an encoder at the server as the encoded video frame, wherein the encoded video frame includes one or more encoded slices that are compressed. The method including decoding the one or more encoded slices at a decoder of the client to generate one or more decoded slices. The method including rendering the one or more decoded slices for display at the client. The method including begin displaying the one or more decoded slices that are rendered before fully receiving the one or more encoded slices at the client.

Other embodiments of the present disclosure disclose a non-transitory computer-readable medium storing a computer program for performing a method. The computer-readable medium including program instructions for receiving an encoded video frame at a client, wherein a server executes an application to generate a rendered video frame which is then encoded at an encoder at the server as the encoded video frame, wherein the encoded video frame includes one or more encoded slices that are compressed. The computer-readable medium including program instructions for decoding the one or more encoded slices at a decoder of the client to generate one or more decoded slices. The computer-readable medium including program instructions for rendering the one or more decoded slices for display at the client. The computer-readable medium including program instructions to begin displaying the one or more decoded slices that are rendered before fully receiving the one or more encoded slices at the client.

Other embodiments of the present disclosure disclose a computer system that includes a processor, and memory coupled to the processor and having stored therein instructions that, if executed by the computer system, cause the computer system to execute a method. The method including receiving an encoded video frame at a client, wherein a server executes an application to generate a rendered video frame which is then encoded at an encoder at the server as the encoded video frame, wherein the encoded video frame includes one or more encoded slices that are compressed. The method including decoding the one or more encoded slices at a decoder of the client to generate one or more decoded slices. The method including rendering the one or more decoded slices for display at the client. The method including begin displaying the one or more decoded slices that are rendered before fully receiving the one or more encoded slices at the client.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
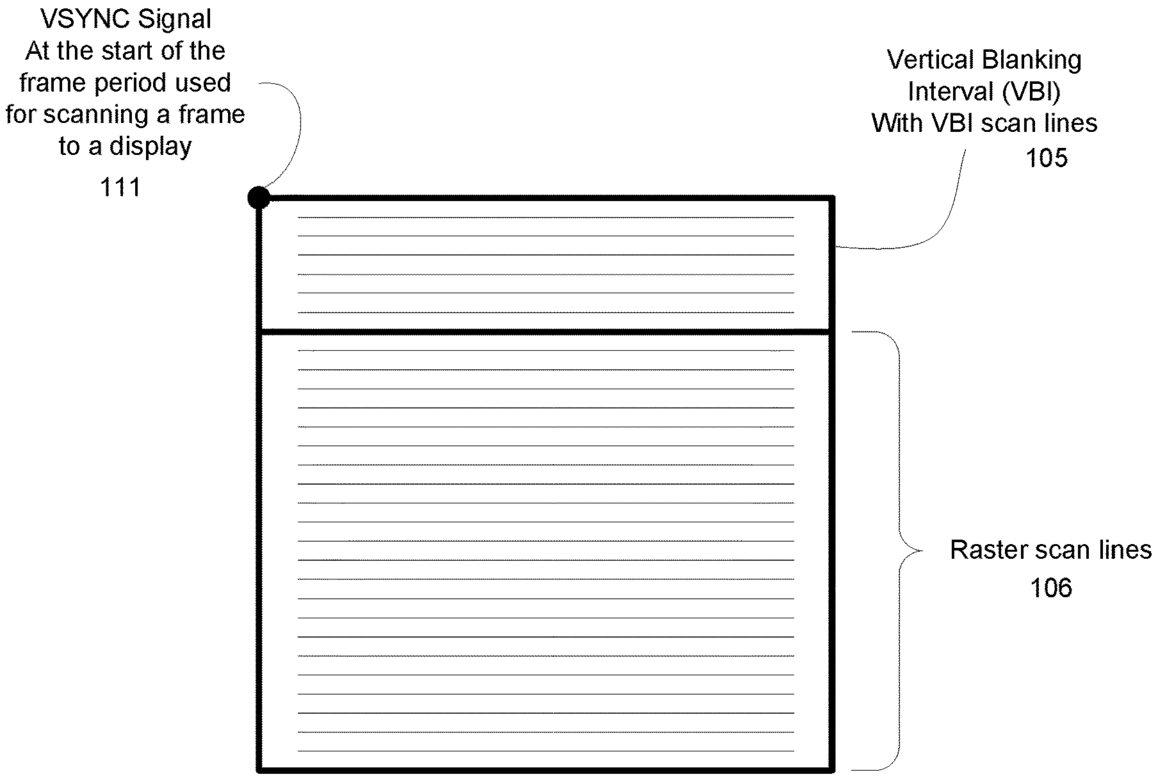
FIG. 1A is a diagram of a VSYNC signal at the beginning of a frame period, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe methods and systems configured to reduce latency and/or latency instability between source and target devices when streaming media content (e.g., streaming audio and video from video games). In particular, in some embodiments of the present disclosure, VSYNC signals between a cloud gaming server and a client are synchronized and offset. Due to differences in clocks at the cloud gaming server and the client, VSYNC signals of the cloud gaming server and client drift relative to each other. This drift leads to up to a frame period of latency instability. For example, when a game is executing at 60 Hz for video frame generation, there is an extra 0-16.7 ms of latency that varies over time. By analyzing worst or near-worst case arrival time of compressed video frames at the client, it is possible to determine the ideal VSYNC relationship between the cloud gaming server and the client. This ideal relationship can be established through tuning of the VSYNC frequency at either the cloud gaming server or the client, such that the latency instability can be removed. In other embodiments of the present disclosure, VSYNC signals between gaming devices (e.g., gaming consoles) are synchronized and offset to provide for an ideal VSYNC relationship and minimal one-way latency between the peer devices. In particular, due to differences in clocks between peer devices (e.g., gaming devices) in head to head gaming, their VSYNC signals will drift relative to each other, introducing up to a frame period of latency instability. For example, when a game is executing at 60 Hz for video frame generation, there is an extra 0-16.7 ms of latency that varies over time. By exchanging timestamp information, it is possible to determine the ideal VSYNC relationship between the peer devices. This ideal relationship can be established through tuning of the VSYNC frequency at either peer device, such that the latency instability can be removed. In still other embodiments of the present disclosure, dynamic client buffering and selected usage of received video frames at the client from a cloud gaming server provides for latency reduction and tuning. Knowledge of server-side timing of the generation of video frames allows for the client to determine ideal display time for each frame. Based on variability of arrival times of compressed video frames at the client, buffering of frames (single buffering, double buffering, triple buffering, etc.) can be dynamically adjusted. Latency tuning may also occur, such as choosing to skip display of a late arriving frame. In other embodiments of the present disclosure, one-way latency between a cloud gaming server and a client may be reduced by overlapping decode of compressed video frames and their display. The client in cloud gaming receives compressed video frames from the cloud gaming server, and decodes the compressed video frames. One-way latency can be reduced by beginning display of a video frame before the frame has been completely received or decoded at the client. Timing of submission for display must anticipate remaining time needed for reception and decode of the compressed video frames.

In particular, latency instability may be introduced between a server and client due to the additional time needed to generate a complex frame (e.g., scene change) at the server, increased times to encode/compress the complex frame at the server, variable communication paths over a network, and increased time to decode complex frames at the client. Latency instability may also be introduced due to differences in clocks at the server and the client, which causes a drift between server and client VSYNC signals. In one embodiment, this latency instability may be removed by tuning either the server VSYNC signal or the client VSYNC signal to bring the server VSYNC signal and the client VSYNC signal back into synchronized alignment (e.g., operating at the same frequency). In another embodiment, adjusting a timing offset between server VSYNC signal and client VSYNC signal reduces one-way latency by accounting for near-worst case latency conditions when receiving and displaying video frames at the client. In still another embodiment, dynamic buffering on the client side provides for additional latency tuning by providing more display buffers at the client when latency increases, and using fewer display buffers when latency decreases. In another embodiment, one-way latency can be further reduced by overlapping decoding and displaying of video frames at the client.

With the above general understanding of the various embodiments, example details of the embodiments will now be described with reference to the various drawings.

Throughout the specification, the reference to "game" or video game" or "gaming application" or "application" is meant to represent any type of interactive application that is directed through execution of input commands. For illustration purposes only, an interactive application includes applications for gaming, word processing, video processing, video game processing, etc. Further, the terms introduced above are interchangeable.

Cloud gaming includes the execution of a video game at the server to generate game rendered video frames, which are then sent to a client for display. Timing of operations at both the server and the client may be tied to respective vertical synchronization (VSYNC) parameters. When VSYNC signals are properly synchronized and/or offset between the server and/or the client, the operations performed at the server (e.g., generation and transmission of video frames over one or more frame periods) are synchronized with the operations performed at the client (e.g., displaying the video frames on a display at a display frame or refresh rate corresponding to the frame period). In particular, a server VSYNC signal generated at the server and a client VSYNC signal generated at the client may be used for synchronizing operations at the server and client. That is, when server and client VSYNC signals are synchronized and/or offset, the server generates and sends video frames in synchronization with how the client displays those video frames.

VSYNC signaling and vertical blanking intervals (VBI) have been incorporated for generating video frames and displaying those video frames when streaming media content between a server and a client. For example, the server strives to generate a game rendered video frame in one or several frame periods as defined by a corresponding server VSYNC signal (e.g if a frame period is 16.7 ms, then generating a video frame each frame period results in 60 Hz operation, and generating one video frame for each two frame periods results in 30 Hz operation), and subsequently encode and transmit that video frame to the client. At the client, the received encoded video frames are decoded and displayed, wherein the client displays each video frame that is rendered for display beginning with a corresponding client VSYNC.

Figure 1B:
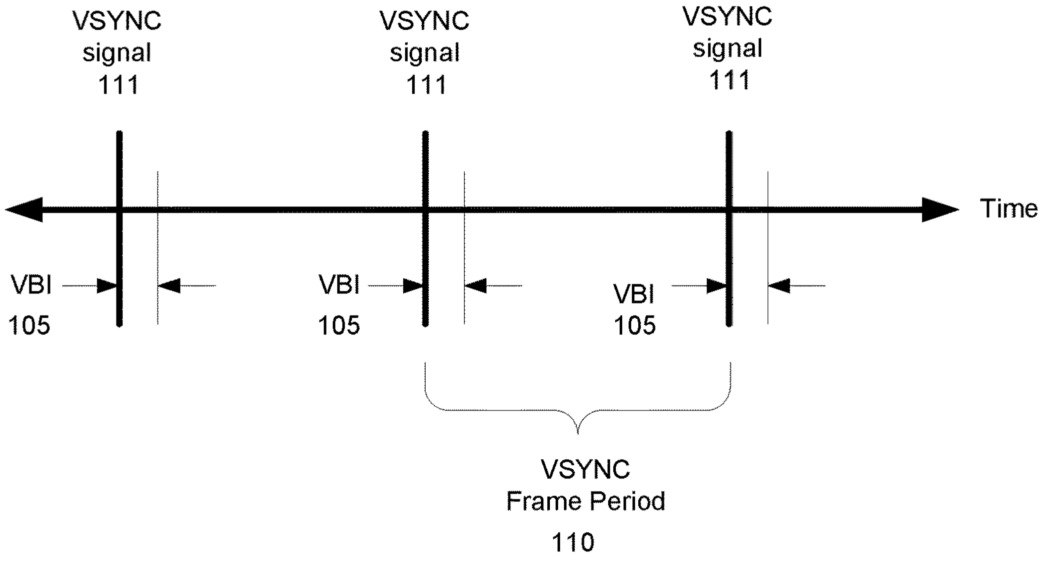
FIG. 1B is a diagram of the frequency of a VSYNC signal, in accordance with one embodiment of the present disclosure.

For illustration, FIG. 1A shows how a VSYNC signal 111 may indicate the beginning of a frame period, wherein various operations may be performed during a corresponding frame period at the server and/or client. When streaming media content, the server may use a server VSYNC signal for generating and encoding video frames, and the client may use a client VSYNC signal for displaying the video frames. The VSYNC signal 111 is generated at a defined frequency which corresponds to the defined frame period 110, as shown in FIG. 1B. In addition, VBI 105 defines the time period between when the last raster line was drawn on the display for a previous frame period and when the first raster line (e.g., top) is drawn to the display. As shown, after VBI 105, the video frame rendered for display is displayed via raster scanlines 106 (e.g., raster line by raster line, from left to right).

In addition, various embodiments of the present disclosure are disclosed for reducing one-way latency and/or latency instability between source and target devices, such as when streaming media content (e.g., video game content). For purposes of illustration only, the various embodiments for reducing one-way latency and/or latency instability are described within a server and client network configuration. However, it is understood that the various techniques disclosed for reducing one-way latency and/or latency instability may be implemented within other network configurations, and/or over peer-to-peer networks, as is shown in FIGS. 2A-2D. For example, the various embodiments disclosed for reducing one-way latency and/or latency instability may be implemented between one or more of server and client devices in various configurations (e.g., server and client, server and server, server and multiple clients, server and multiple servers, client and client, client and multiple clients, etc.).

Figure 2A:
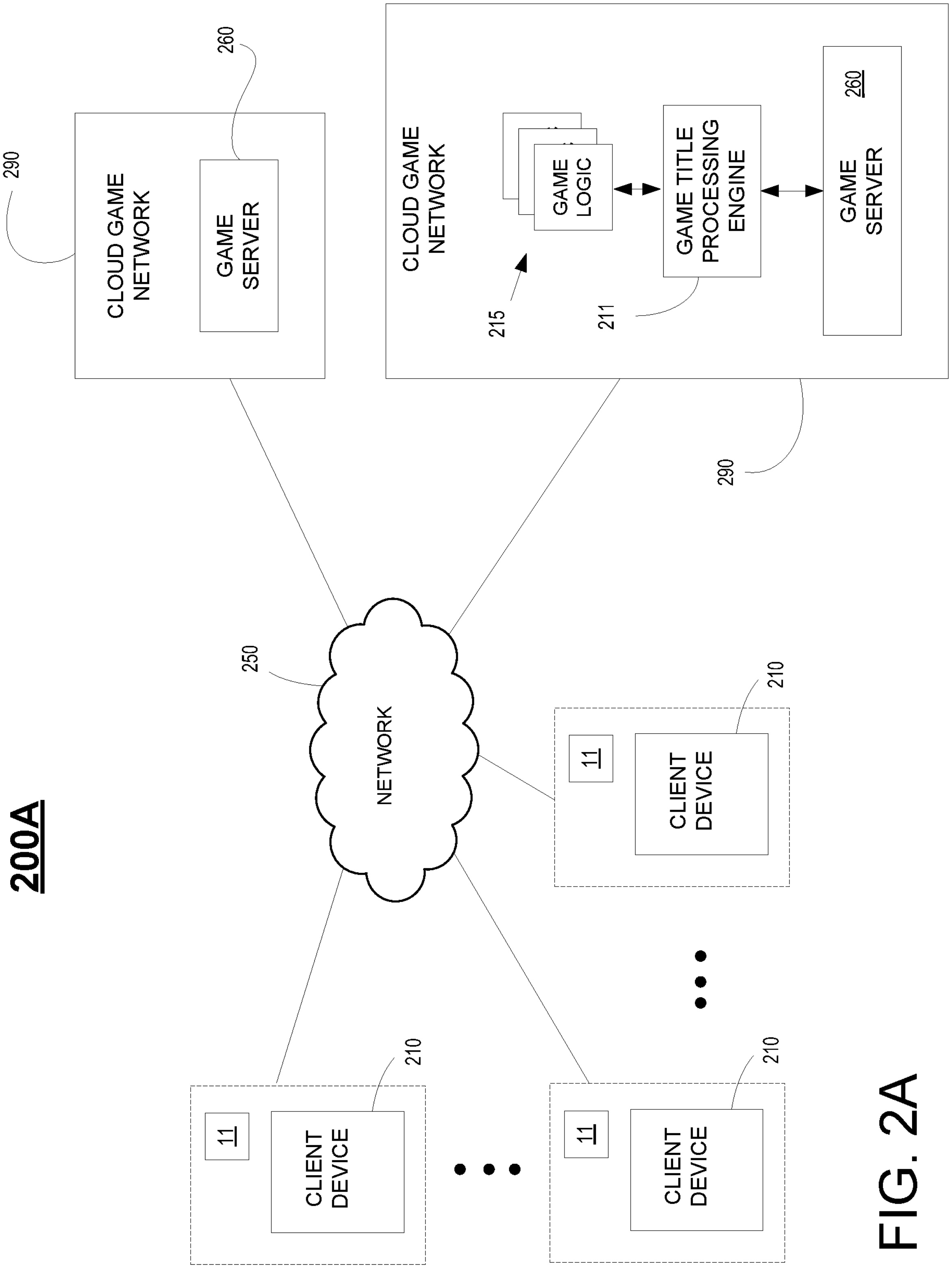
FIG. 2A is a diagram of a system for providing gaming over a network between one or more cloud gaming servers, and one or more client devices, in various configurations, wherein VSYNC signals can be synchronized and offset to reduce one-way latency, in accordance with one embodiment of the present disclosure.

FIG. 2A is a diagram of a system 200A for providing gaming over a network 250 between one or more cloud gaming networks 290 and/or servers 260, and one or more client devices 210, in various configurations, wherein server and client VSYNC signals can be synchronized and offset, and/or wherein dynamic buffering is performed on the client, and/or wherein decode and display operations on the client can be overlapped to reduce one-way latency between the server 260 and client 210, in accordance with one embodiment of the present disclosure. In particular, system 200A provides gaming via a cloud game network 290, wherein the game is being executed remote from client device 210 (e.g., thin client) of a corresponding user that is playing the game, in accordance with one embodiment of the present disclosure. System 200A may provide gaming control to one or more users playing one or more games through the cloud game network 290 via network 250 in either single-player or multi-player modes. In some embodiments, the cloud game network 290 may include a plurality of virtual machines (VMs) running on a hypervisor of a host machine, with one or more virtual machines configured to execute a game processor module utilizing the hardware resources available to the hypervisor of the host. Network 250 may include one or more communication technologies. In some embodiments, network 250 may include $5^{th}$ Generation (5G) network technology having advanced wireless communication systems.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

As shown, the cloud game network 290 includes a game server 260 that provides access to a plurality of video games. Game server 260 may be any type of server computing device available in the cloud, and may be configured as one or more virtual machines executing on one or more hosts. For example, game server 260 may manage a virtual machine supporting a game processor that instantiates an instance of a game for a user. As such, a plurality of game processors of game server 260 associated with a plurality of virtual machines is configured to execute multiple instances of one or more games associated with gameplays of a plurality of users. In that manner, back-end server support provides streaming of media (e.g., video, audio, etc.) of gameplays of a plurality of gaming applications to a plurality of corresponding users. That is, game server 260 is configured to stream data (e.g., rendered images and/or frames of a corresponding gameplay) back to a corresponding client device 210 through network 250. In that manner, a computationally complex gaming application may be executing at the back-end server in response to controller inputs received and forwarded by client device 210. Each server is able to render images and/or frames that are then encoded (e.g., compressed) and streamed to the corresponding client device for display.

For example, a plurality of users may access cloud game network 290 via communications network 250 using corresponding client devices 210 configured for receiving streaming media. In one embodiment, client device 210 may be configured as a thin client providing interfacing with a back end server (e.g., game server 260 of cloud game network 290) configured for providing computational functionality (e.g., including game title processing engine 211). In another embodiment, client device 210 may be configured with a game title processing engine and game logic for at least some local processing of a video game, and may be further utilized for receiving streaming content as generated by the video game executing at a back-end server, or for other content provided by back-end server support. For local processing, the game title processing engine includes basic processor based functions for executing a video game and services associated with the video game. The game logic is stored on the local client device 210 and is used for executing the video game.

In particular, client device 210 of a corresponding user (not shown) is configured for requesting access to games over a communications network 250, such as the internet, and for rendering for display images generated by a video game executed by the game server 260, wherein encoded images are delivered to the client device 210 for display in association with the corresponding user. For example, the user may be interacting through client device 210 with an instance of a video game executing on game processor of game server 260. More particularly, an instance of the video game is executed by the game title processing engine 211. Corresponding game logic (e.g., executable code) 215 implementing the video game is stored and accessible through a data store (not shown), and is used to execute the video game. Game title processing engine 211 is able to support a plurality of video games using a plurality of game logics, each of which is selectable by the user.

For example, client device 210 is configured to interact with the game title processing engine 211 in association with the gameplay of a corresponding user, such as through input commands that are used to drive gameplay. In particular, client device 210 may receive input from various types of input devices, such as game controllers, tablet computers, keyboards, gestures captured by video cameras, mice, touch pads, etc. Client device 210 can be any type of computing device having at least a memory and a processor module that is capable of connecting to the game server 260 over network 250. The back-end game title processing engine 211 is configured for generating rendered images, which is delivered over network 250 for display at a corresponding display in association with client device 210. For example, through cloud based services the game rendered images may be delivered by an instance of a corresponding game executing on game executing engine 211 of game server 260. That is, client device 210 is configured for receiving encoded images (e.g., encoded from game rendered images generated through execution of a video game), and for displaying the images that are rendered for display 11. In one embodiment, display 11 includes an HMD (e.g., displaying VR content). In some embodiments, the rendered images may be streamed to a smartphone or tablet, wirelessly or wired, direct from the cloud based services or via the client device 210 (e.g., PlayStation® Remote Play).

In one embodiment, game server 260 and/or the game title processing engine 211 includes basic processor based functions for executing the game and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include memory management, multi-thread management, quality of service (QoS), bandwidth testing, social networking, management of social friends, communication with social networks of friends, communication channels, texting, instant messaging, chat support, etc.

In one embodiment, cloud game network 290 is a distributed game server system and/or architecture. In particular, a distributed game engine executing game logic is configured as a corresponding instance of a corresponding game. In general, the distributed game engine takes each of the functions of a game engine and distributes those functions for execution by a multitude of processing entities. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the cloud game network 290, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g., video frames, audio, etc.) for the gaming application in response to controller input by a player. The distribution synchronization layer is able to efficiently execute (e.g., through load balancing) those functions across the distributed processing entities, such that critical game engine components/functions are distributed and reassembled for more efficient processing.

The game title processing engine 211 includes a central processing unit (CPU) and graphics processing unit (GPU) group that is configured to perform multi-tenancy GPU functionality. In another embodiment, multiple GPU devices are combined to perform graphics processing for a single application that is executing on a corresponding CPU.

Figure 2B:
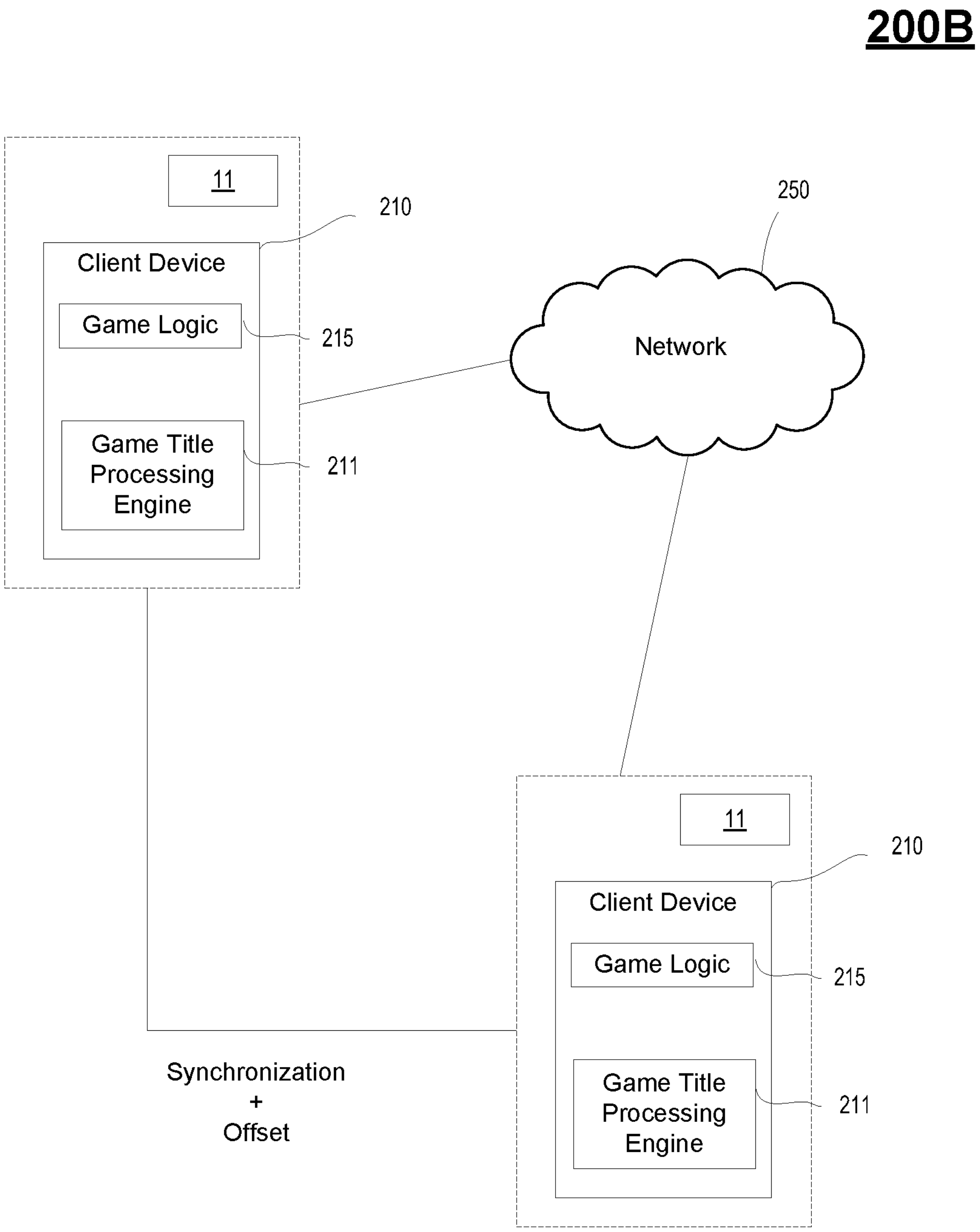
FIG. 2B is a diagram for providing gaming between two or more peer devices, wherein VSYNC signals can be synchronized and offset to achieve optimal timing of receipt of controller and other information between the devices, in accordance with one embodiment of the present disclosure.

FIG. 2B is a diagram for providing gaming between two or more peer devices, wherein VSYNC signals can be synchronized and offset to achieve optimal timing of receipt of controller and other information between the devices, in accordance with one embodiment of the present disclosure. For example, head-to-head gaming may be performed using two or more peer devices that are connected through network 250 or directly through peer-to-peer communication (e.g., Bluetooth, local area networking, etc.).

As shown, a game is being executed locally on each of the client devices 210 (e.g., game console) of corresponding users that are playing the video game, wherein the client devices 210 communicate through peer-to-peer networking. For example, an instance of a video game is executing by the game title processing engine 211 of a corresponding client device 210. Game logic 215 (e.g., executable code) implementing the video game is stored on the corresponding client device 210, and is used to execute the game. For purposes of illustration, game logic 215 may be delivered to the corresponding client device 210 through a portable medium (e.g. optical media) or through a network (e.g., downloaded through the internet from a gaming provider).

In one embodiment, the game title processing engine 211 of a corresponding client device 210 includes basic processor based functions for executing the game and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include memory management, multi-thread management, quality of service (QoS), bandwidth testing, social networking, management of social friends, communication with social networks of friends, communication channels, texting, instant messaging, chat support, etc.

Client device 210 may receive input from various types of input devices, such as game controllers, tablet computers, keyboards, gestures captured by video cameras, mice, touch pads, etc. Client device 210 can be any type of computing device having at least a memory and a processor module, and is configured for generating rendered images executed by the game title processing engine 211, and for displaying the rendered images on a display (e.g., display 11, or display 11 including a head mounted display—HMD, etc.). For example, the rendered images may be associated with an instance of the game executing locally on client device 210 to implement gameplay of a corresponding user, such as through input commands that are used to drive gameplay. Some examples of client device 210 include a personal computer (PC), a game console, a home theater device, a general purpose computer, mobile computing device, a tablet, a phone, or any other types of computing devices that can execute an instance of a game.

Figure 2C:
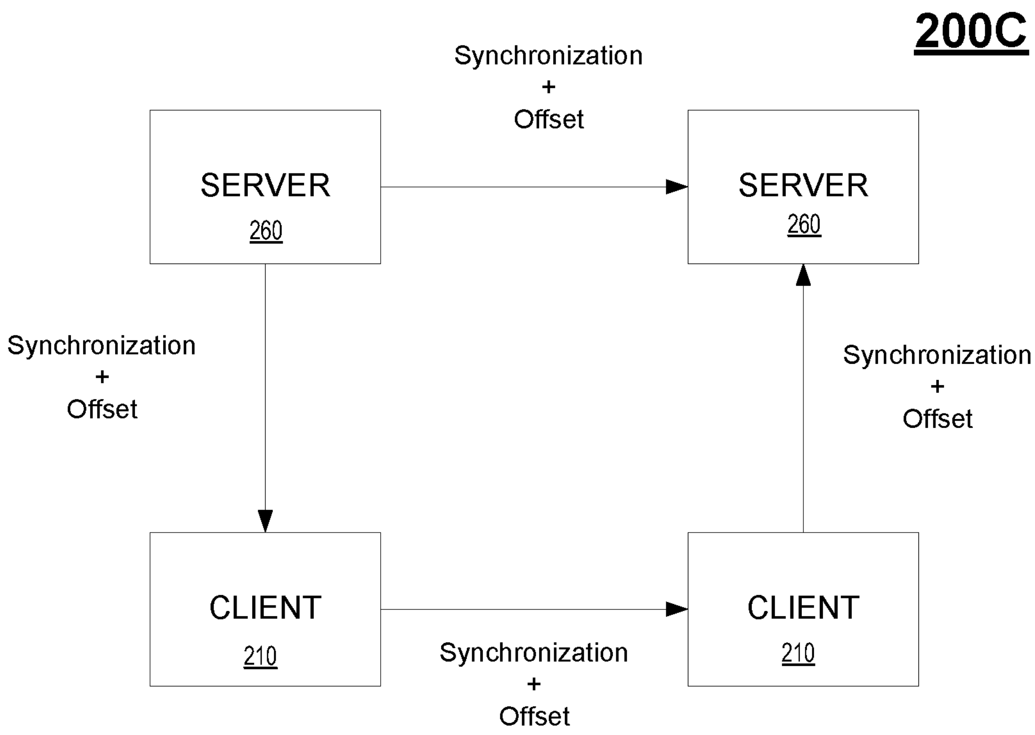
FIG. 2C illustrates various network configurations that benefit from proper synchronization and offsetting of VSYNC signals between a source device and a target device, in accordance with one embodiment of the present disclosure.

FIG. 2C illustrates various network configurations that benefit from proper synchronization and offsetting of VSYNC signals between a source device and a target device, including those configurations shown in FIGS. 2A-2B, in accordance with embodiments of the present disclosure. In particular, the various network configurations benefit from proper alignment of frequencies of server and client VSYNC signals, and a timing offset of the server and client VSYNC signals, for purposes of reducing one-way latency and/or latency variability between a server and client. For example, one network device configuration includes a cloud gaming server (e.g., source) to client (target) configuration. In one embodiment, the client may include a WebRTC client configured for providing audio and video communication inside a web browser. Another network configuration includes a client (e.g. source) to server (target) configuration. Still another network configuration includes a server (e.g., source) to server (e.g., target) configuration. Another network device configuration includes a client (e.g., source) to client (target) configuration, wherein the clients can each be a gaming console to provide for head-to-head gaming, for example.

In particular, alignment of VSYNC signals may include synchronizing the frequencies of the server VSYNC signal and the client VSYNC signal, and may also include adjusting a timing offset between the client VSYNC signal and server VSYNC signal, for the purposes of removing drift, and/or to maintain an ideal relationship between server and client VSYNC signals, for purposes of reducing one-way latency and/or latency variability. To achieve proper alignment, the server VSYNC signal may be tuned in order to implement proper alignment between a server 260 and client 210 pair, in one embodiment. In another embodiment, the client VSYNC signal may be tuned in order to implement proper alignment between a server 260 and client 210 pair. Once the client and server VSYNC signals are aligned, the server VSYNC signal and client VSYNC signal occur at substantially the same frequency, and are offset from each other by a timing offset, that may be adjusted from time to time. In another embodiment, alignment of VSYNC signals may include synchronizing the frequencies of VSYNC for two clients, and may also include adjusting a timing offset between their VSYNC signals, for the purposes of removing drift, and/or achieving optimal timing of receipt of controller and other information; either VSYNC signal may be tuned to achieve this alignment. In still another embodiment, alignment may include synchronizing the frequencies of VSYNC for a plurality of servers, and may also include synchronizing the frequencies of the server VSYNC signals and the client VSYNC signals and adjusting a timing offset between the client VSYNC and server VSYNC signals, e.g. for head-to-head cloud gaming. In the server to client configuration and the client to client configuration, alignment may include both synchronization of the frequencies between the server VSYNC signal and client VSYNC signal, as well as providing a proper timing offset between the server VSYNC signal and client VSYNC signal. In the server to server configuration, alignment may include synchronization of the frequencies between the server VSYNC signal and client VSYNC signal without setting a timing offset.

Figure 2D:
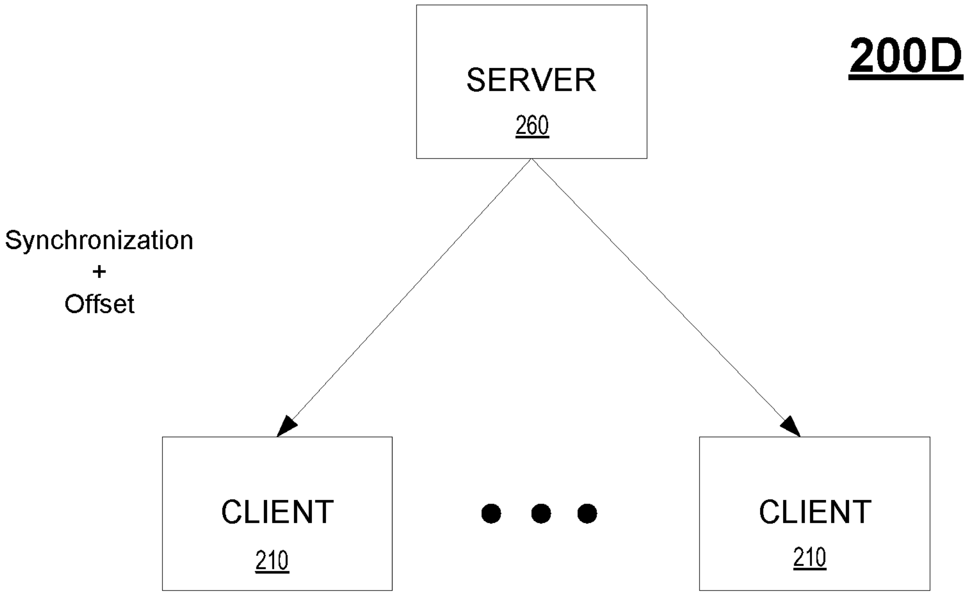
FIG. 2D illustrates a multi-tenancy configuration between a cloud gaming server and multiple clients that benefit from proper synchronization and offsetting of VSYNC signals between a source device and a target device, in accordance with one embodiment of the present disclosure.

FIG. 2D illustrates a multi-tenancy configuration between a cloud gaming server 260 and one or more clients 210 that benefit from proper synchronization and offsetting of VSYNC signals between a source device and a target device, in accordance with one embodiment of the present disclosure. In the server to client configuration, alignment may include both synchronization of the frequencies between the server VSYNC signal and client VSYNC signal, as well as providing a proper timing offset between the server VSYNC signal and client VSYNC signal. In the multi-tenancy configuration, the client VSYNC signal is tuned at each client 210 in order to implement proper alignment between a server 260 and client 210 pair, in one embodiment.

For example, a graphics subsystem may be configured to perform multi-tenancy GPU functionality, wherein one graphics subsystem could be implementing graphics and/or rendering pipelines for multiple games, in one embodiment. That is, the graphics subsystem is shared between multiple games that are being executed. In particular, a game title processing engine may include a CPU and GPU group that is configured to perform multi-tenancy GPU functionality, wherein one CPU and GPU group could be implementing graphics and/or rendering pipelines for multiple games, in one embodiment. That is, the CPU and GPU group is shared between multiple games that are being executed. The CPU and GPU group could be configured as one or more processing devices. In another embodiment, multiple GPU devices are combined to perform graphics processing for a single application that is executing on a corresponding CPU.

Figure 3:
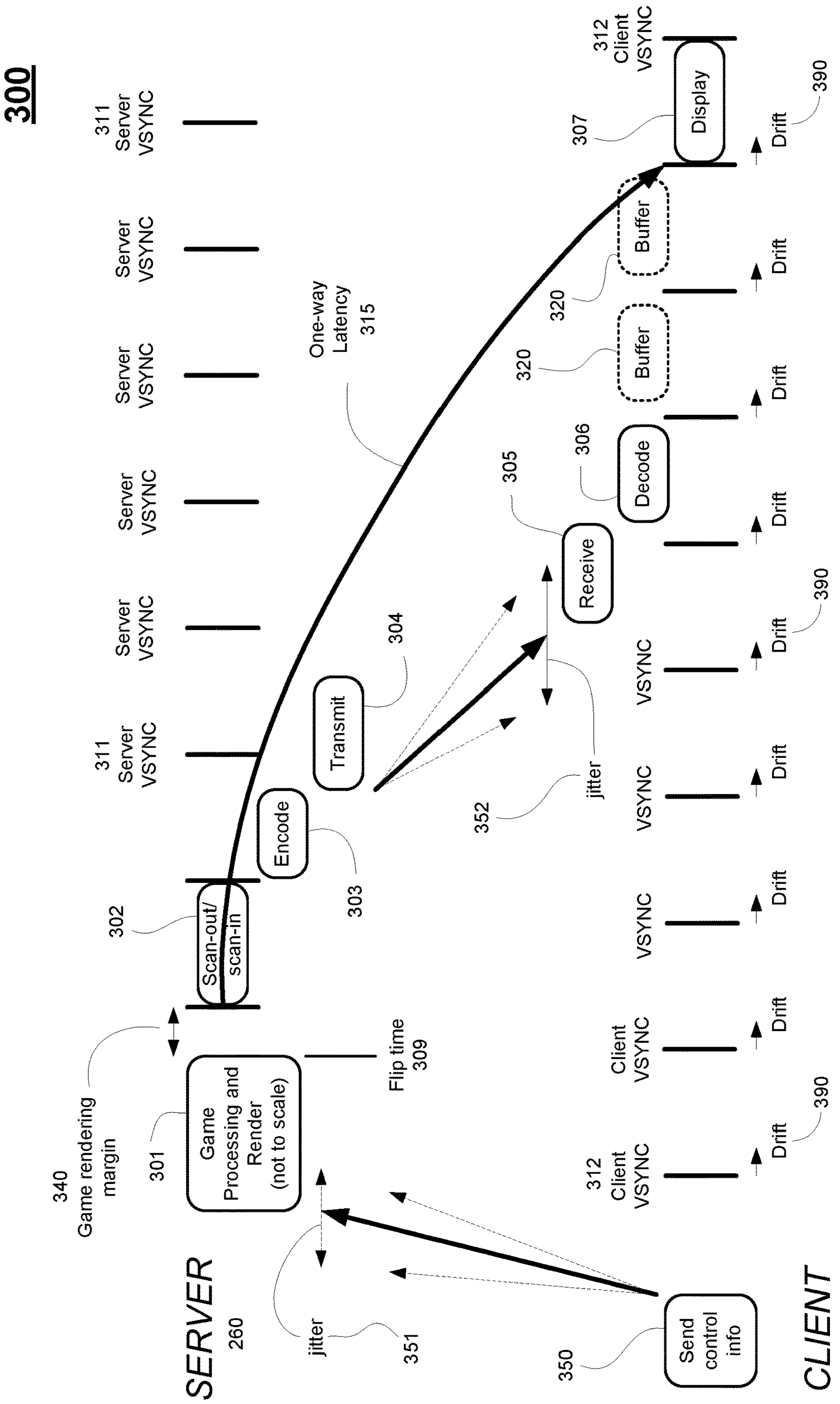
FIG. 3 illustrates the variation in one-way latency between a cloud gaming server and a client due to clock drift when streaming video frames generated from a video game executing on the server, in accordance with one embodiment of the present disclosure.

FIG. 3 illustrates the general process of executing a video game at a server to generate game rendered video frames and sending those video frames to a client for display. Traditionally, a number of the operations at the game server 260 and client 210 are performed within a frame period as defined by a respective VSYNC signal. For example, the server 260 strives to generate a game rendered video frame at 301 in one or multiple frame periods as defined by a corresponding server VSYNC signal 311. The video frame is generated by the game, either in response to control information (e.g., input commands of a user) delivered from an input device at operation 350, or game logic not driven by control information. Transmission jitter 351 may be present when sending control information to the server 260, wherein jitter 351 measures the variation of network latency from client to server (e.g., when sending input commands). As shown, the bold arrow shows the current delay when sending control information to the server 260, but due to jitter there may be a range of arrival times for control information at the server 260 (e.g. range bounded by the dotted arrows). At flip-time 309, the GPU reaches a flip command that indicates that the corresponding video frame has been completely generated and placed into the frame buffer at the server 260. Thereafter, the server 260 performs scan-out/scan-in (operation 302, wherein scan-out may be aligned with the VSYNC signal 311) for that video frame over the subsequent frame period as defined by the server VSYNC signal 311 (the VBI is omitted for clarity). Subsequently the video frame is encoded (operation 303) (e.g. encoding starts after an occurrence of the VSYNC signal 311, and the end of encoding may not be aligned with the VSYNC signal) and transmitted (operation 304, wherein transmission may not be aligned with the VSYNC signal 311) to the client 210. At the client 210, the encoded video frames are received (operation 305, wherein receive may not be aligned with the client VSYNC signal 312), decoded (operation 306, wherein decode may not be aligned with the client VSYNC signal 312), buffered, and displayed (operation 307, wherein the start of display may be aligned with the client VSYNC signal 312). In particular, the client 210 displays each video frame that is rendered for display beginning with a corresponding occurrence of the client VSYNC signal 312.

One-way latency 315 may be defined as being the latency from beginning of transfer of the video frame to the encoding unit (e.g. scan-out 302) at the server, to the beginning of display of the video frame at the client 307. That is, one-way latency is the time from server scan-out to client display, taking into account client buffering. Individual frames have a latency from beginning of scan-out 302 to completion of decode 306 that may vary from frame to frame due to the high degree of variance of server operations such as encode 303 and transmission 304, network transmission between the server 260 and client 210 with accompanying jitter 352, and client reception 305. As shown, the straight bold arrow shows the current latency when sending the corresponding video frame to the client 210, but due to jitter 352 there may be a range of arrival times for video frames at the client 210 (e.g. range bounded by the dotted arrows). As one-way latency must be relatively stable (e.g. kept fairly consistent) to achieve a good play experience, traditionally buffering 320 is performed with the result that the display of individual frames with low latency (e.g. from beginning of scan-out 302 to completion of decode 306) is delayed for several frame periods. That is, if there are network instabilities, or unpredictable encode/decode time, extra buffering is needed so that one-way latency is kept consistent.

One-way latency between a cloud gaming server and a client may vary due to clock drift when streaming video frames generated from a video game executing on the server, in accordance with one embodiment of the present disclosure. That is, differences in the frequencies of the server VSYNC signal 311 and the client VSYNC signal 312 may cause the client VSYNC signal to drift relative to the frames arriving from the server 260. The drift may be due to very slight differences in the crystal oscillators used in each of the respective clocks at the server and client. Furthermore, embodiments of the present disclosure reduce one-way latency by performing one or more of synchronization and offset of VSYNC signals for alignment between a server and a client, by providing dynamic buffering on the client, and by overlapping decoding and displaying of video frames at the client.

Figure 4:
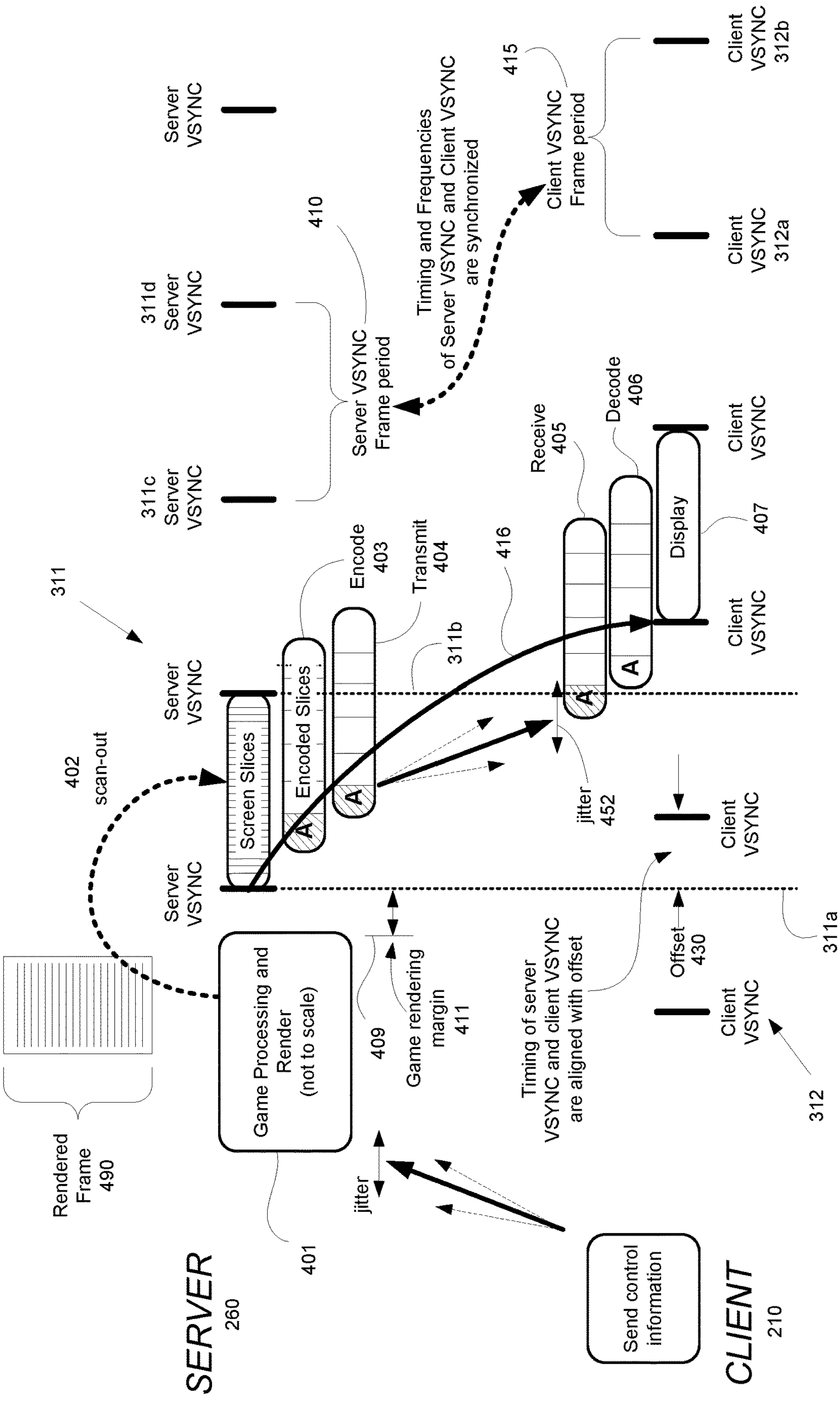
FIG. 4 illustrates a network configuration including a cloud gaming server and a client when streaming video frames generated from a video game executing on the server, the VSYNC signals between the server and the client being synchronized and offset to allow for overlapping of operations at the server and client, and to reduce one-way latency between the server and the client, in accordance with one embodiment of the disclosure.

FIG. 4 illustrates the flow of data through a network configuration including a highly optimized cloud gaming server 260 and a highly optimized client 210 when streaming video frames generated from a video game executing on the server, wherein overlapping server operations and client operations reduces the one-way latency, and synchronizing and offsetting the VSYNC signals between the server and the client reduces the one-way latency as well as reduces variability in the one-way latency between the server and the client, in accordance with embodiments of the present disclosure. In particular, FIG. 4 shows the desired alignment between the server and the client VSYNC signals. In one embodiment, tuning of the server VSYNC signal 311 is performed to obtain proper alignment between server and client VSYNC signals, such as in a server and client network configuration. In another embodiment, tuning of the client VSYNC signal 312 is performed to obtain proper alignment between server and client VSYNC signals, such as in a multi-tenant server to multiple clients network configuration. For purposes of illustration, tuning of the server VSYNC signal 311 is described in FIG. 4 for purposes of synchronizing the frequencies of server and client VSYNC signals, and/or adjusting the timing offset between corresponding client and server VSYNC signals, though it is understood that the client VSYNC signal 312 may also be used for tuning.

As shown, FIG. 4 illustrates an improved process of executing a video game at a server to generate rendered video frames and sending those video frames to a client for display, in embodiments of the present disclosure. The process is shown with respect to generation and display of a single video frame at a server and client. In particular, the server generates a game rendered video frame at 401. For example, the server 260 includes a CPU (e.g., game title processing engine 211) configured for executing the game.

The CPU generates one or more draw calls for a video frame, wherein the draw calls include commands placed into a command buffer for execution by a corresponding GPU of the server 260 in a graphics pipeline. The graphics pipeline may include one or more shader programs on vertices of objects within a scene to generate texture values as rendered for the video frame for displaying, wherein the operations are performed in parallel through a GPU for efficiency. At flip-time 409, the GPU reaches a flip command in the command buffer that indicates that the corresponding video frame has been completely generated and/or rendered and placed into the frame buffer at the server 260.

At 402, the server performs scan-out of the game rendered video frame to an encoder. In particular, scan-out is performed scanline by scanline, or in groups of consecutive scanlines, wherein a scanline refers to a single horizontal line, for example of a display from screen edge to screen edge. These scanlines or groups of consecutive scanlines are sometimes referred to as slices, and are referred to in this specification as screen slices. In particular, scan-out 402 may include a number of processes that modify the game rendered frame, including overlaying it with another frame buffer, or shrinking it in order to surround it with information from another frame buffer. During scan-out 402, the modified video frame is then scanned into an encoder for compression. In one embodiment, scan-out 402 is performed at an occurrence 311*a* of the VSYNC signal 311. In other embodiments, scan-out 402 may be performed before the occurrence of the VSYNC signal 311, such as at flip-time 409.

At 403, the game rendered video frame (which may have undergone modification) is encoded on an encoder slice by encoder slice basis at the encoder to generate one or more encoded slices, wherein an encoded slice is unrelated to a scanline or screen slice. As such, the encoder generates one or more encoded (e.g., compressed) slices. In one embodiment, the encoding process begins before the scan-out 402 process has fully completed for a corresponding video frame. Further, the start and/or end of encode 403 may or may not be aligned with the server VSYNC signal 311. The boundaries of an encoded slice are not restricted to a single scanline, and may be comprised of a single scanline, or multiple scanlines. Additionally, the end of an encoded slice and/or the start of the next encoder slice may not necessarily occur at the edges of the display screen (e.g., may occur somewhere mid-screen or in the middle of a scanline), such that the encoded slice need not traverse fully from edge to edge of the display screen. As shown, one or more encoded slices may be compressed and/or encoded, including "encoded slice A" that is compressed having hash marks.

At 404, the encoded video frame is transmitted from the server to the client, wherein the transmission may occur on an encoded slice-by-slice basis, wherein each encoded slice is an encoder slice that has been compressed. In one embodiment, the transmission process 404 begins before the encoding process 403 has fully completed for a corresponding video frame. Further, the start and/or end of transmission 404 may or may not be aligned with the server VSYNC signal 311. As shown, encoded slice A that is compressed is transmitted to the client independently of the other compressed encoder slices for the rendered video frame. The encoder slices may be transmitted one at a time, or in parallel.

At 405, the client receives the compressed video frame, again on an encoded slice-by-slice basis. Further, the start and/or end of receive 405 may or may not be aligned with the client VSYNC signal 312. As shown, encoded Slice A that is compressed is received by the client. Transmission jitter 452 may be present between the server 260 and client 210, wherein jitter 452 measures the variation in network latency from the server 260 to the client 210. A lower jitter value exhibits a more stable connection. As shown, the bold straight arrow shows the current latency when sending the corresponding video frame to the client 210, but due to jitter there may be a range of arrival times for video frames at the client 210 (e.g. range bounded by the dotted arrows). Variation in latency may also be due to one or more operations at the server such as encode 403 and transmission 404, as well as networking issues that introduce latency when transmitting video frames to the client 210.

At 406, the client decodes the compressed video frame, again on an encoded slice-by-slice basis, producing decoded Slice A (shown without hash marks) that is now ready for display. In one embodiment, the decode process 406 begins before the receive process 405 has fully completed for a corresponding video frame. Further, the start and/or end of decode 406 may or may not be aligned with the client VSYNC signal 312. At 407, the client displays the decoded rendered video frame on the display at the client. That is, the decoded video frame is placed in a display buffer which is streamed out on a scanline-by-scanline basis to a display device, for example. In one embodiment, the display process 407 (i.e. the streaming out to the display device) begins after the decode process 406 has fully completed for a corresponding video frame, i.e. the decoded video frame is fully resident in the display buffer. In another embodiment, the display process 407 begins before the decode process 406 has fully completed for a corresponding video frame. That is, streamout to the display device begins from the address of the display buffer at a time at which only a portion of the decoded frame buffer is resident in the display buffer. The display buffer is then updated or filled in with remaining portions of the corresponding video frame in time for displaying, such that the updating of the display buffer is performed prior to streamout of those portions to the display. Further, the start and/or end of display 407 is aligned with the client VSYNC signal 312.

In one embodiment, the one-way latency 416 between the server 260 and the client 210 may be defined as the elapsed time between when scan-out 402 begins and when display 407 begins. Embodiments of the present disclosure are capable of aligning the VSYNC signals (e.g. synchronize the frequency and adjust the offset) between the server and the client, to reduce one-way latency between the server and the client, and to reduce variability in the one-way latency between the server and the client. For example, embodiments of the present disclosure are able to calculate an optimal adjustment to the offset 430 between server VSYNC signal 311 and client VSYNC signal 312 such that even in the event of near worst case time needed for server processing such as encode 403 and transmit 404, near worst case network latency between server 260 and client 210, and near worst case client processing such as receive 405 and decode 406, the decoded rendered video frame is available in time for the display process 407. That is, it is not necessary to determine the absolute offset between server VSYNC and client VSYNC; it is sufficient to adjust the offset so that the decoded rendered video frame is available in time for the display process.

In particular, the frequencies of the server VSYNC signal 311 and the client VSYNC signal 312 may be aligned through synchronization. Synchronization is achieved through tuning the server VSYNC signal 311 or the client VSYNC signal 312. For purposes of illustration, tuning is described in relation to the server VSYNC signal 311, though it is understood that tuning could be performed on the client VSYNC signal 312 instead. For example, as shown in FIG. 4 the server frame period 410 (e.g. the time between two occurrences 311*c* and 311*d* of the server VSYNC signal 311) is substantially equal to the client frame period 415 (e.g. the time between two occurrences 312*a* and 312*b* of the client VSYNC signal 312), which indicates that the frequencies of the server VSYNC signal 311 and client VSYNC signal 312 are also substantially equal.

To maintain synchronization of the frequencies of the server and client VSYNC signals, the timing of the server VSYNC signal 311 may be manipulated. For example, the vertical blanking interval (VBI) in the server VSYNC signal 311 may be increased or reduced over a period of time, such as to account for the drift between the server VSYNC signal 311 and the client VSYNC signal 312. Manipulation of vertical blanking (VBLANK) lines in the VBI provides for adjusting the number of scanlines used for VBLANK for one or more frame periods of the server VSYNC signal 311. Dropping the number of scanlines of VBLANK reduces a corresponding frame period (e.g., time interval) between two occurrences of the server VSYNC signal 311. Conversely, increasing the number of scanlines of VBLANK increases a corresponding frame period (e.g., time interval) between two occurrences of the VSYNC signal 311. In that manner, the frequency of the server VSYNC signal 311 is adjusted to align the frequencies between the client and server VSYNC signals 311 and 312 to be at substantially the same frequency. Also, offset between server and client VSYNC signals can be adjusted by increasing or reducing the VBI for a short period of time, before returning the VBI to its original value. In one embodiment, the server VBI is adjusted. In another embodiment, the client VBI is adjusted. In yet another embodiment, instead of two devices (server and client), there are a plurality of connected devices, each of which may have a corresponding VBI that is adjusted. In one embodiment, each of the plurality of connected devices may be independent peer devices (e.g. without a server device). In another embodiment, the plurality of devices may include one or more server devices and/or one or more client devices arranged in one or more server/client architectures, multi-tenant server/client(s) architecture, or some combination thereof.

Alternatively, the pixel clock of the server (e.g., located at the southbridge of a northbridge/southbridge core logic chipset of the server) may be manipulated to perform coarse and/or fine tuning of the frequency of the server VSYNC signal 311 over a period of time to bring the synchronization of frequencies between server and client VSYNC signals 311 and 312 back into alignment, in one embodiment. Specifically, the pixel clock in the south bridge of the server may be overclocked or underclocked to adjust the overall frequency of the VSYNC signal 311 of the server. In that manner, the frequency of the server VSYNC signal 311 is adjusted to align the frequencies between the client and server VSYNC signals 311 and 312 to be at substantially the same frequency. Offset between server and client VSYNC can be adjusted by increasing or reducing the client server pixel clock for a short period of time, before returning the pixel clock to its original value. In one embodiment, the server pixel clock is adjusted. In another embodiment, the client pixel clock is adjusted. In another embodiment, the client pixel clock is adjusted. In yet another embodiment, instead of two devices (server and client), there are a plurality of connected devices, each of which may have a corresponding pixel clock which is adjusted. In one embodiment, each of the plurality of connected devices may be independent peer devices (e.g. without a server device). In another embodiment, the plurality of connected devices may include one or more server devices and one or more client devices arranged in one or more server/client architectures, multi-tenant server/client(s) architecture, or some combination thereof.

Figure 5A:
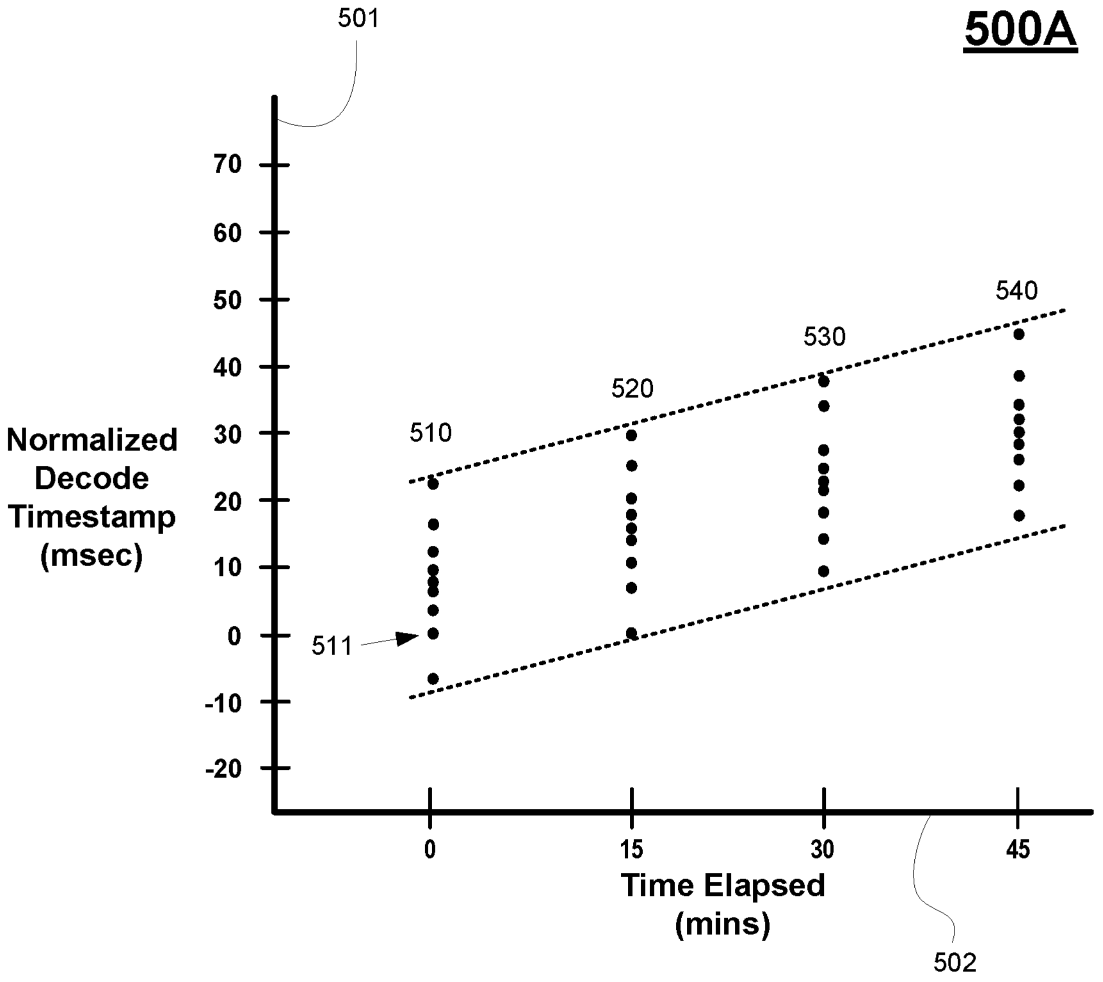
FIG. 5A is a diagram illustrating possible variations in the timing of the completion of the decode by the client relative to the desired display time as specified by the server, due to drift between the respective clocks at the cloud gaming server and a client, as well as variation in the time taken by client and server operations and network latency, in accordance with one embodiment of the present disclosure.

FIG. 5A is a diagram illustrating possible variations in the timing of the completion of the decode 406 by the client 210 when streaming video frames generated from a video game executed on the server 260, due to drift 390 between the respective clocks at the cloud gaming server 260 and a client 210, as well as variation in the time taken by server operations such as encode 403 and transmission 404, network latency, and client operations such as receive 405 and decode 406, in accordance with one embodiment of the present disclosure.

The y-axis 501 shows time in milliseconds. The x-axis 502 shows time in minutes. In embodiments of the present disclosure, the server 260 sends timestamp information with the compressed video frames to the client 210, or the server may send the timestamp information separate from the compressed video frames. In one embodiment, this timestamp information may represent the time, as derived from the pixel clock of the server 260, of an occurrence of the server VSYNC signal immediately prior to scan-out 402 of the corresponding video frame. That is, the timestamp gives an indication of desired display timing of the corresponding video frame, such as if the video frame were to be immediately displayed. In another embodiment, this timestamp information may represent the time, as derived from the pixel clock of the server 260, of the flip-time, e.g. the completion of the rendering of the corresponding video frame. In yet another embodiment, regular frame periods are used instead of a server VSYNC signal, and this timestamp information may represent the time, as derived from the pixel clock of the server 260, of the beginning or end a corresponding frame period.

Figure 5B:
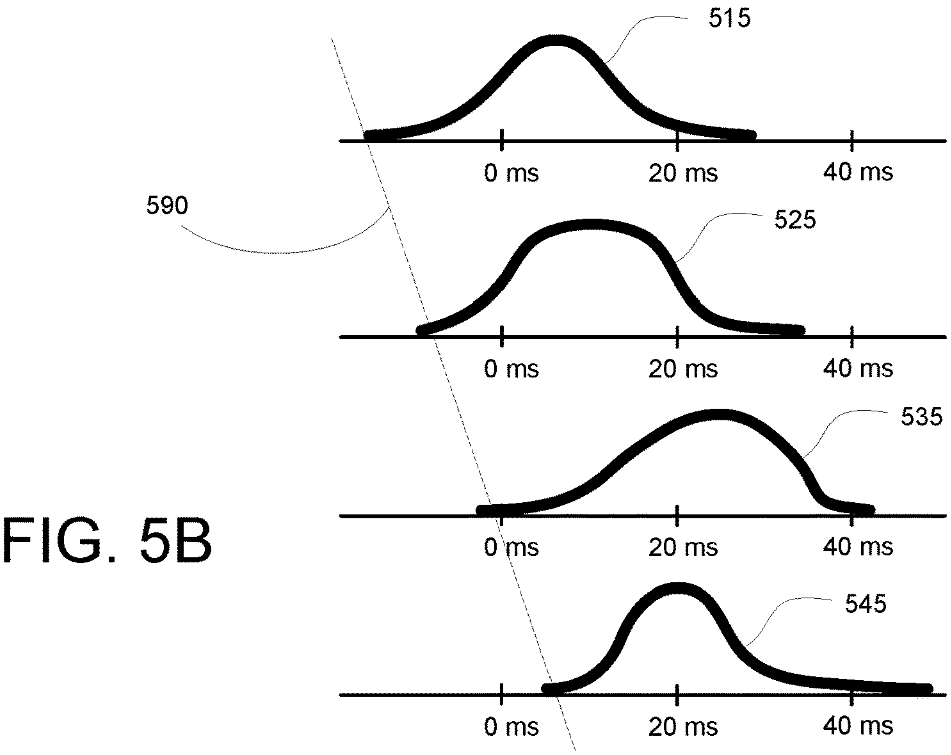
FIG. 5B includes histograms illustrating the timing of the completion of decode by the client relative to the desired display time as specified by the server, and shows an increase in the measured decode times in subsequent histograms due to drift between the respective clocks at the cloud gaming server and a client, in accordance with one embodiment of the present disclosure.

On completion of the decode 406, the client 206 notes the time, as derived from the pixel clock of the client, and subtracts this time from the timestamp (as delivered from the server) to create a “decode timestamp” (that is, the time at which the decoding is completed, not the time taken to decode the corresponding video frame). The decode timestamp therefore gives an indication of the availability for display at the client of the corresponding video frame, relative to its desired display time as specified by the server (e.g. as indicated by the timestamp). As shown in FIG. 5A, the decode timestamp of the first compressed video frame received by the client is assigned a value of zero (i.e. it is normalized), in one embodiment. Also, all other decode timestamps are calculated with reference to the normalization (i.e. subtracted and accounting for normalization). Due to variance in server and client operations, as well as network latency, decode timestamps measured for a series of compressed video frames may be plotted as a distribution 510, with the first compressed video frame 511 assigned a decode timestamp of zero, as previously described. These decode timestamps may be binned to create a histogram 515, as is shown in FIG. 5B, described more fully below. Measurements 520, 530, and 540 illustrate distributions of decode timestamps calculated for subsequent video frames received at the client. The decode timestamp in measurements 520, 530, and 540 are calculated with reference to the normalization defined by the first compressed video frame 511.

FIG. 5B includes histograms illustrating the timing of the completion of decode by the client relative to the desired display time as specified by the server (e.g. corresponding timestamps), and shows an increase in the decode timestamps in subsequent histograms due to drift between the respective clocks at the cloud gaming server and a client, in accordance with one embodiment of the present disclosure. In particular, the decode timestamps for each of the measurements 520, 530, and 540 determined at later times for subsequent video frames may be binned to create corresponding histograms. For example, the decode timestamps plotted in measurement 520 may be binned to create histogram 525. Similarly, the decode timestamps plotted in measurement 530 may be binned to create histogram 535, and the decode timestamps plotted in measurement 540 may be binned to create histogram 545. Each of histograms 515, 525, 535, and 545 may have unique characteristics. As shown, even though the width of the distributions of the decode timestamps in each of the measurements 515, 525, 535, and 545 are approximately similar, the later determined histograms show an increase in decode timestamps as they are each shifted to the right in time, such as due to drift between server and client clocks used to generate VSYNC frequencies.

In particular, measurements 520, 530 and 540 of the decode timestamps determined at later times for subsequent video frames (and their corresponding histograms 525, 535 and 545 shown in FIG. 5B) show the effects of differences between the server VSYNC signal 311 and the client VSYNC signal 312 (i.e. drift 390 of FIG. 3). The drift 390 between the server and client clocks and as reflected in corresponding VSYNC signals may be illustrated in FIG. 5B as line 590. For example a difference of 10 ppm (parts per million) in the clocks at the server and client due to the inaccuracies of crystal oscillators used to generate VSYNC frequencies at the server and client will result in one frame period (16.7 ms) of drift between the server and client roughly every 30 minutes; drift can take the form of decreased or increased decode timestamps, depending on the whether the server VSYNC 311 is slightly higher or lower frequency than the client VSYNC signal 312.

Figure 5C:
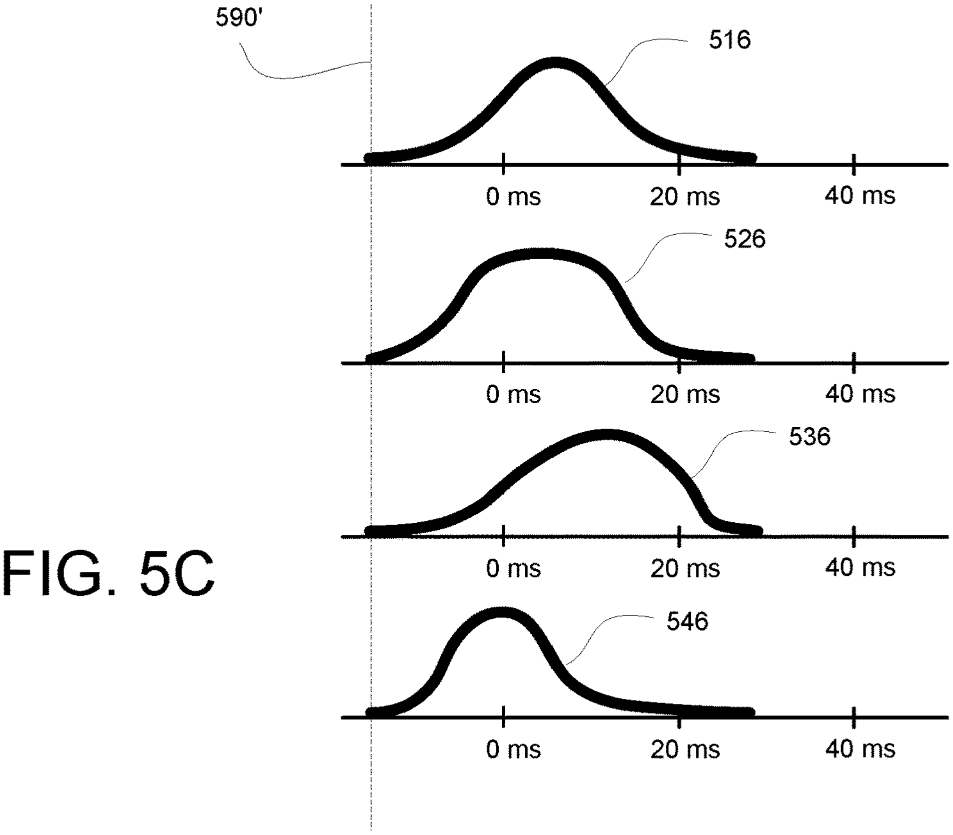
FIG. 5C includes histograms illustrating the timing of the completion of decode by the client relative to the desired display time as specified by the server, and shows consistent measurements of decode times in subsequent histograms after compensating for the measured drift between the respective clocks at the cloud gaming server and a client, in accordance with one embodiment of the present disclosure.

FIG. 5C includes histograms illustrating the timing of the completion of decode by the client relative to the desired display time as specified by the server, and shows consistent measurements of decode times in subsequent histograms after compensating for the measured drift between the respective clocks at the cloud gaming server and a client, in accordance with one embodiment of the present disclosure. In one embodiment, dynamically regenerating the histogram allows for calculating the amount of drift; knowledge of the amount of drift allows for a corresponding adjustment in VSYNC frequencies and removal of the drift, resulting in histograms such as 516, 526, 536 and 546 over time. In that manner, the plotted measurements 520, 530 and 540 would not show an increase in decode timestamps (e.g., shifting vertically upward along x-axis 501 of FIG. 5A), but would be plotted more horizontally aligned with measurement 510 (i.e. showing no increase in one-way latency) in FIG. 5A. This is reflected in FIG. 5C, wherein line 590' shows zero drift between the server and client clocks and as reflected in corresponding VSYNC signals (i.e. showing no increase in one-way latency of the histograms 526, 536, and 546).

In another embodiment, the server sends a compressed video frame each and every frame period (wherein frame periods are approximately equal in length), and rather than a corresponding server timestamp (e.g. used in the decode timestamp calculation) being sent from server to client, instead the corresponding server timestamp (for the corresponding video frame being received) is calculated by the client by adding a frame period to the previously calculated server timestamp (e.g. for the previous video frame that has been received). An initial server timestamp and/or timing signal for an initial video frame may be delivered from the server to the client to start the timing process.

In yet another embodiment, drift is calculated using timestamp information sent from server to client, either separately from or together with the compressed video frames, e.g. by analyzing the variance between the timestamp information and the timing of the reception of the timestamp information at client. In still other embodiments, the server uses frame periods that are approximately equal in size instead of using a server VSYNC signal, and the drift of the server frame period relative to the client VSYNC (or some multiple thereof) may be calculated. As such, the server frame periods may be adjusted in response to the drift computation.

In other embodiments, instead of two devices (server and client), there are a plurality of connected devices, each of which may have their drift measured relative to one or a plurality of the others. In one embodiment, each of the plurality of connected devices may be independent peer devices (e.g. without a server device). In another embodiment, the plurality of devices may include one or more server devices and one or more client deices arranged in one or more server/client architectures, multi-tenant server/client(s) architectures, or some combination thereof.

As such, the measured drift between the frequency of the VSYNC signal between two devices (e.g. server and client, or any two devices in a plurality of networked devices with servers, clients and independent peers) may be used to adjust the VSYNC signal at one or a plurality of devices. Tuning may include removing or adding a raster scan line for a vertical blanking interval of a corresponding frame period. Tuning may also include overclocking or under clocking a corresponding clock. Tuning may be performed dynamically, with the adjustment of the corresponding VSYNC signal varying over time. In some embodiments, the server may use frame periods that are approximately equal in size instead of using a VSYNC signal, and the server frame periods may be adjusted in response to the drift computation.

Further, alignment of the server and client VSYNC signals as shown in FIG. 4 may include adjusting the server VSYNC signal 311 to provide the proper timing offset 430 between corresponding client and server VSYNC signals. In one embodiment, using histogram data (e.g. shown in at least FIGS. 5A-5C) the timing offset may be determined such that a predetermined number or threshold (e.g., 99.99 percent) of received video frames arrive at the client in time to be displayed at the next appropriate occurrence of the client VSYNC signal 312. That is, the timing offset 430 (e.g. shown in FIG. 4) is adjusted so as to accommodate for a near worst case scenario of a video frame, such that that video frame is ready for display (e.g. received, decoded and placed in display buffer for streamout at the client) in time with the least amount of time before the next occurrence of the client VSYNC signal 312. As an illustration, a threshold of 99.99 percent provides for 1 missed video frame out of ten thousand video frames that are generated at server 260 and displayed at the client 210.

In particular, in order to establish the proper offset 430, the frequency of the server VSYNC signal 311 may be manipulated over a period of time (e.g., one or more frame periods) to move the timing of one or more occurrences of a corresponding server VSYNC signal 311, thereby shifting or adjusting the relative timing offset between client and server VSYNC signals once both VSYNC signals have synchronized their respective frequencies. The frequency of the client VSYNC signal 312 may likewise be manipulated to adjust the relative timing offset between client and server VSYNC signals, alternatively. The determination of the proper offset may be performed dynamically, e.g. repeatedly over time, with corresponding dynamic manipulation of VSYNC signals. In other embodiments, rather than first removing drift between the server VSYNC signal and the client VSYNC signal and then establishing the proper offset between the VSYNC signals, instead the offset is maintained by more frequently manipulating the frequency of the server VSYNC signal or the client VSYNC signal to adjust the relative timing offset. In yet other embodiments, the server uses frame periods that are approximately equal in size instead of using a server VSYNC signal, and the server frame period or the client VSYNC signal may be manipulated to adjust the relative timing offset of the server frame periods with regards to the client VSYNC (or some multiple thereof). In still other embodiments, instead of two devices (server and client), there are a plurality of connected devices, each of which may have their VSYNC signal manipulated to adjust the relative timing offset of its VSYNC with regards to the VSYNC of one or a plurality of other devices. In one embodiment, each of the plurality of connected devices may be independent peer devices (e.g. without a server device). In another embodiment, the plurality of devices may include one or more server devices and one or more client deices arranged in one or more server/client architectures, multi-tenant server/client(s) architectures, or some combination thereof.

Figure 6A:
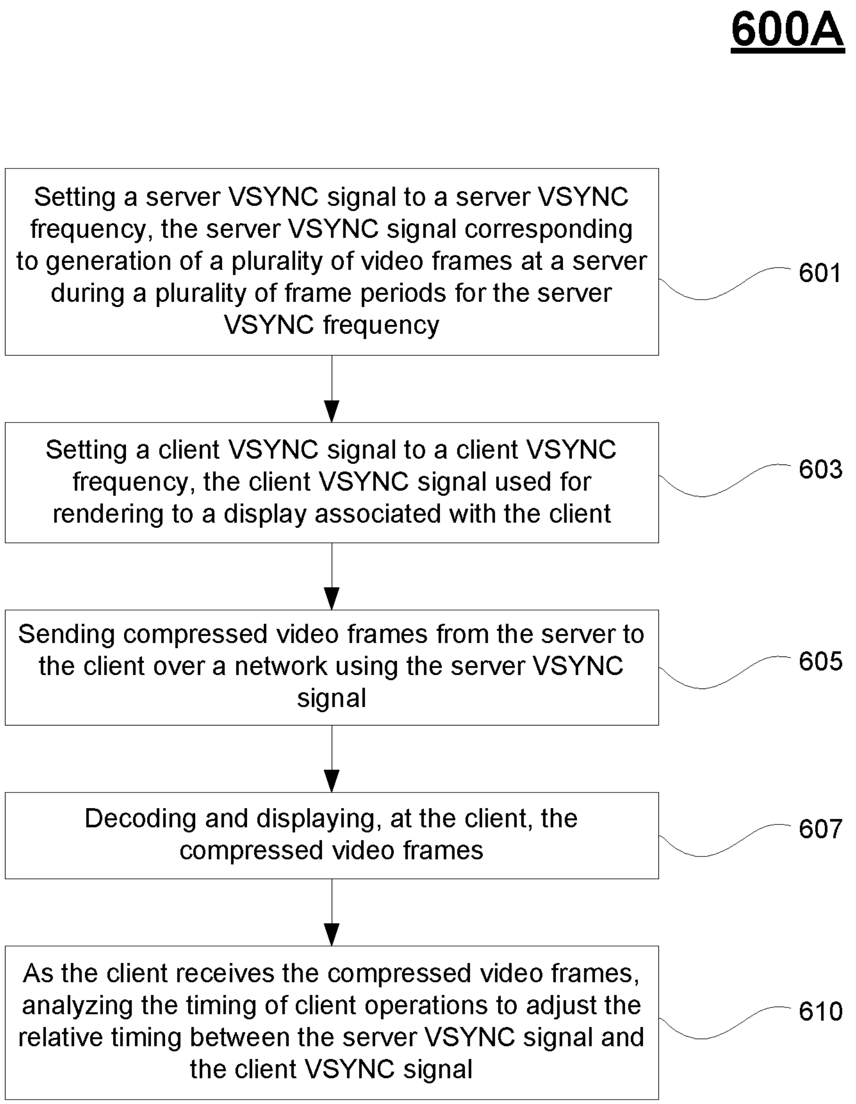
FIG. 6A is a flow diagram illustrating a method for tuning VSYNC signals between a cloud gaming server and a client for purposes of reducing one-way latency, in accordance with one embodiment of the present disclosure.
Figure 6B:
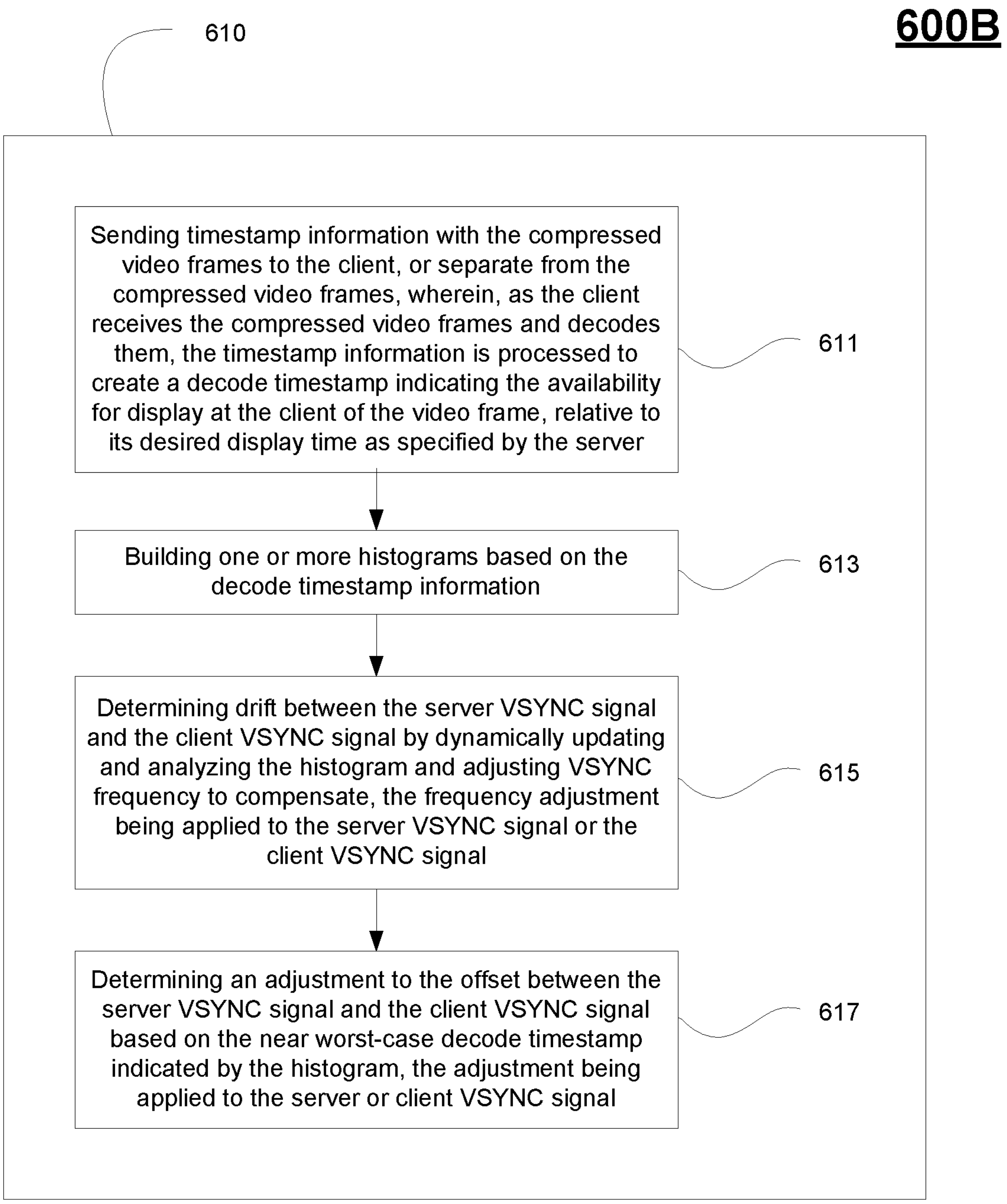
FIG. 6B is a flow diagram illustrating a method for aligning VSYNC signals when performing tuning of the VSYNC signals between a cloud gaming server and a client for purposes of reducing one-way latency, including the building of a histogram providing the distribution of timing of the completion of decode by the client relative to the desired display time as specified by the server, the histogram configured for determining an adjustment to the offset between VSYNC signals at the server and client, the histogram also configured for determining a drift between the server VSYNC signal and the client VSYNC signal, in accordance with one embodiment of the present disclosure.
Figure 6C:
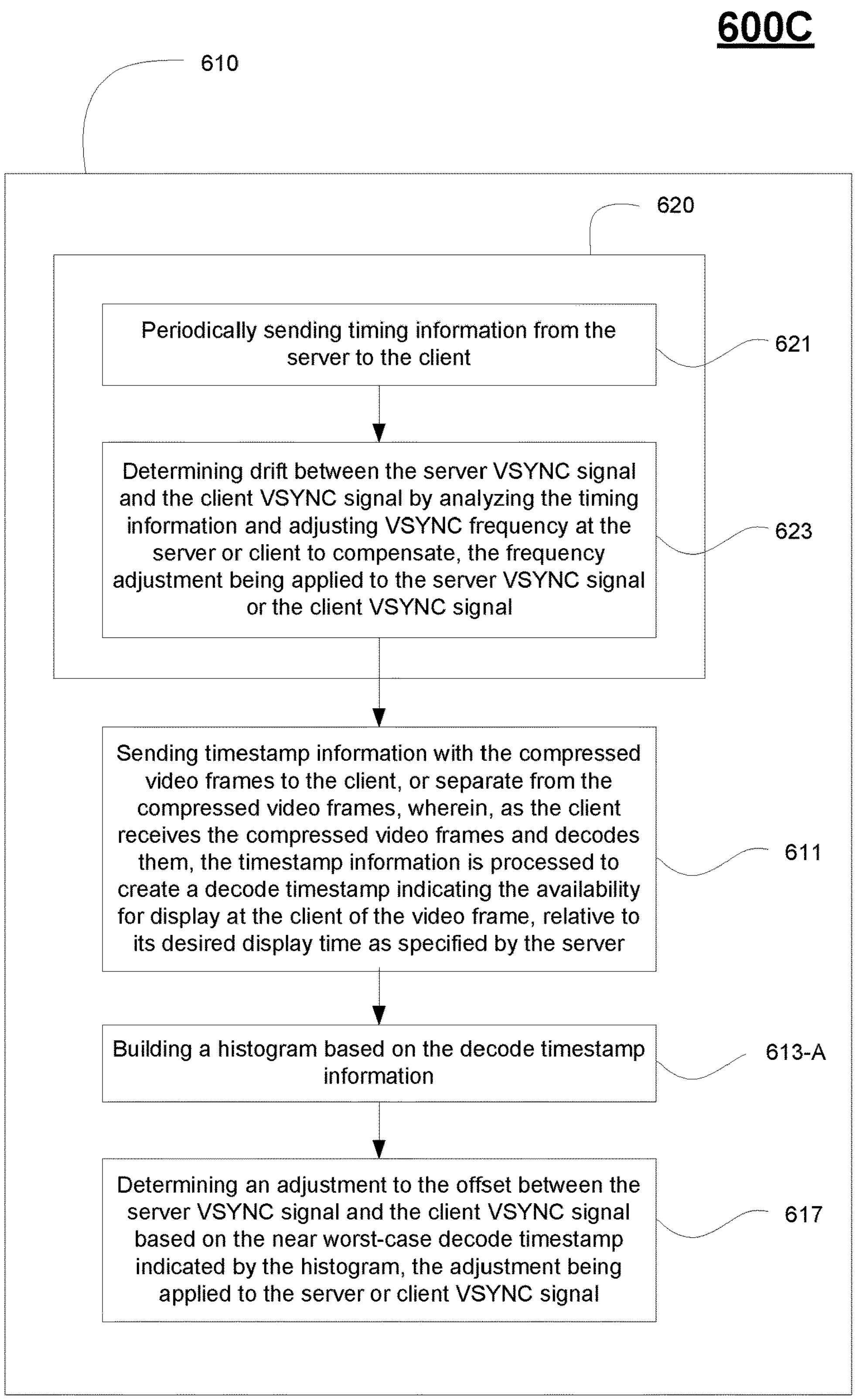
FIG. 6C is a flow diagram illustrating another method for synchronizing VSYNC signals when performing tuning of the VSYNC signals between a cloud gaming server and a client for purposes of reducing one-way latency, in accordance with one embodiment of the present disclosure.

With the detailed description of the various client devices 210 and/or the cloud gaming network 290 (e.g., in the game server 260) of FIGS. 2A-2D, flow diagrams 600A, 600B, and 600C of FIGS. 6A-6C illustrate methods for tuning VSYNC signals between a cloud gaming server and a client for purposes of reducing one-way latency, in accordance with one embodiment of the present disclosure.

In particular, FIG. 6A illustrates a method for adjusting the relative timing between VSYNC signals of a cloud gaming server and a client for purposes of reducing one-way latency, in accordance with one embodiment of the present disclosure. For example, flow diagram 600A may be performed to adjust timing between corresponding client and server VSYNC signals shown in FIG. 4.

At 601, the method includes setting, at a server, a server VSYNC signal to a server VSYNC frequency. As previously described, the server VSYNC signal corresponds to generation of a plurality of video frames at the server during a plurality of frame periods for the server VSYNC frequency. For example, the server may be executing a video game in a streaming mode, such that the CPU of a server executes the video game responsive to input commands from a user in order to generate game rendered video frames using a graphics pipeline that can be used for streaming.

At 603, the method includes setting, at a client, a client VSYNC signal to a client VSYNC frequency. The client VSYNC signal is used for rendering to a display associated with the client. That is, the timing for rendering and displaying video frames at the client may be referenced to the client VSYNC signal. For example, the video frames can be displayed beginning with a corresponding occurrence of the client VSYNC signal.

In one embodiment, the client VSYNC frequency is set approximately to the server VSYNC frequency. For example, the server may send a control signal to the client, wherein the control signal is used by the client to set the client VSYNC signal to the apparent frequency of the server VSYNC signal. That is, the control signal may include the apparent frequency to which the client VSYNC signal is set. That is, the client VSYNC frequency is set to the same apparent frequency as the server VSYNC frequency, although the real server and client VSYNC frequencies may not match due to differences in the crystal oscillators used for clocks at the server and client.

At 605, the method includes sending a plurality of compressed video frames based on the plurality of video frames from the server to the client over a network using the server VSYNC signal. In particular, the game rendered video frames generated responsive to processing of a video game by the server in a streaming mode are delivered (e.g., during scan-out 402) to an encoder configured to perform compression and produce a plurality of compressed video frames. As previously described, the start of encoding for a corresponding video frame may be aligned with a corresponding occurrence of the server VSYNC signal, or may occur before a corresponding occurrence, such as at flip-time. The compressed video frames are transmitted and/or delivered to the client for display during a gaming session. Transmission of video frames need not begin in alignment with the server VSYNC signal, and may begin as soon as a portion of the corresponding video frame or the complete video frame has been encoded, as is shown in FIG. 4.

At 607, the method includes decoding and displaying, at the client, the plurality of compressed video frames. As previously described, the client receives a plurality of compressed video frames, which are then decoded by a decoder of the client. For example, the client receives one or more encoded slices for a corresponding compressed video frame. The compressed video frames are then decoded and placed into a display buffer. For example, the encoded slices of a corresponding compressed video frame are then decoded, such that the decoded video frame is placed in the display buffer. During decoding, the decoded slices may be rendered for display, wherein rendering includes generating screen slices (e.g. scanlines) from the decoded slices of a corresponding video frame, which are then streamed to a display of the client. In particular, pixel data of decoded slices of a corresponding video frame may be placed into the proper addresses of the display buffer for streaming (e.g. scanline-by-scanline) to the display at the client.

At 610, the method includes analyzing the timing of one or more client operations to adjust the relative timing between the server VSYNC signal and the client VSYNC signal, as the client receives the plurality of compressed video frames. For example, the relative timing is adjusted to achieve proper alignment (e.g. synchronize frequencies and adjust offset) between server and client VSYNC signals, for purposes of reducing one-way latency and reducing variability in the one-way latency between the server and client. In one embodiment, proper timing between the server and client VSYNC signals is achieved by adjusting at least one of the server VSYNC signal and the client VSYNC signal. A more detailed discussion of adjusting the relative timing between server and client VSYNC signals is provided in FIGS. 6B-6C, below.

FIG. 6B is a flow diagram 600B illustrating a method for aligning VSYNC signals when performing tuning of the VSYNC signals between a cloud gaming server and a client, in accordance with one embodiment of the present disclosure. For example, alignment includes synchronizing the frequencies and/or adjusting the offset between a server VSYNC signal and a client VSYNC signal, such as for purposes of reducing one-way latency. In particular, FIG. 6B provides additional detail to the adjusting of the relative timing between the server and client VSYNC signals outlined in operation 610 of FIG. 6A.

At 611, the method includes sending timestamp information associated with the plurality of video frames (e.g. generated by the server as game rendered video frames) from the server to the client. In one embodiment, timestamp information is sent to the client with the plurality of compressed video frames. In another embodiment, the timestamp information is sent to the client separate from the plurality of compressed video frames.

In particular, the timestamp information includes a corresponding timestamp for a corresponding video frame that is generated at the server, as derived by a pixel clock of a server. In one implementation, a timestamp for a corresponding video frame may occur at a corresponding occurrence of the server VSYNC signal used for scanning the corresponding video frame to an encoder, such as during scan-out (e.g. occurrence of server VSYNC signal immediately prior to scan-out of a corresponding video frame). In another implementation, a timestamp for a corresponding video frame may occur at a corresponding flip-time at the server. The timestamp gives an indication of the desired display timing of the corresponding video frame as determined by the video game, such as when scanning or streaming to a local display—without transmission over a network.

As the client receives the compressed video frames and decodes them, the timestamp information is processed to create a decode timestamp indicating the availability for display at the client of a corresponding video frame, relative to its desired display time as specified by the server (the timestamp). As previously described, the client notes the time, as derived from the pixel clock of the client, at the completion of decoding the corresponding video frame. This time of completion of decoding is subtracted from the corresponding timestamp delivered from the server to create a decode timestamp. Further, a first compressed video frame that is decoded may be normalized, such that its decode timestamp is adjusted to zero, using a normalization factor that may be applied (e.g. added to or subtracted from) to all subsequently measured and/or calculated decode times for subsequently received compressed video frames at the client.

At 613, the method includes building one or more histograms based on the decode timestamps measured and/or calculated. In particular, a corresponding histogram is created by binning the decode timestamp information that is measured for compressed video frames received at a client over a period of time. As noted above the decode timestamp measured and normalized for a corresponding video frame gives an indication of when the decoded video frame is available for display at the client, relative to the desired display time as indicated by the server timestamp. In that manner, the corresponding histogram provides a distribution of the timing of the completion of decode by the client relative to the desired display time as specified by the server for a plurality of video frames. As such, the one or more generated histograms may be used to adjust the relative timing between the server and client VSYNC signals, for purposes of reducing one-way latency and or the variation in one-way latency between a server and client.

At 615, the relative timing between server and client VSYNC signals is adjusted to synchronize the server VSYNC frequency of the server VSYNC signal and the client VSYNC frequency of the client VSYNC signal. In one embodiment, drift is determined between the server VSYNC signal and the client VSYNC signal using corresponding histograms. For example, one or more histograms generated from video frames received by the client are continuously and dynamically updated. The histograms are analyzed to determine a drift between the server VSYNC signal and the client VSYNC signal. For example, FIG. 5B illustrates how drift (e.g. as reflected by line 590) may be determined when plotting multiple histograms, as previously described.

Alternative methods for determining drift between server and client VSYNC signals may be used for synchronization. For instance, analysis of decode timestamps over a period of time may be performed to determine a trending increase or decrease in decode timing, which can be used to determine the drift. In another example, drift may be calculated by analyzing the variance between timestamp information generated at the server and the client based timing of the receipt of the server based timestamp information. Also, drift may be measured between a plurality of connected devices, which may be independent peer devices, or server and client devices, arranged in peer-to-peer architectures, or server/client architectures, or some combination thereof.

Further, based on the timestamp information sent from the server to the client, at least one of the server VSYNC frequency and the client VSYNC frequency may be adjusted to compensate for the measured drift. For example, the frequency of the server VSYNC signal or the client VSYNC signal can be adjusted for a period of time such that the actual frequencies of server and client VSYNC signals are approximately similar over that period of time. In that manner, the frequencies of the server and client VSYNC signal are synchronized.

As previously described, the frequency of a corresponding server or client VSYNC signal may be tuned by removing or adding a raster scan line for a vertical blanking interval of a corresponding frame period, wherein the VSYNC signal may be adjusted for a period of time. Tuning may include overclocking or under-clocking a corresponding pixel clock the server or client for a period of time. Further, tuning may be performed continuously by dynamically adjusting a corresponding VSYNC signal appropriately over time.

At 617, the relative timing between server and client VSYNC signals is adjusted by adjusting the relative offset between the server VSYNC signal and the client VSYNC signal based on the timestamp information. Similarly, the relative phase between server and client VSYNC signals may be adjusted based on the timestamp. The adjustment to the relative phase or offset for the server and client VSYNC signals may be applied to the server or client VSYNC signal, once the frequencies for server and client VSYNC signals have been synchronized.

In particular, an adjustment to the offset between the server VSYNC signal and the client VSYNC signal is determined based on a near worst case decode timestamp indicated by a corresponding histogram. For example, the timing offset may be determined such that a predetermined number or threshold (e.g. 99.99 percent) of received video frames arrive at the client in time to be decoded and displayed at the next appropriate occurrence of the client VSYNC signal. In that manner, even a near worst case scenario of one-way latency for a video frame is accounted for when adjusting the timing offset between the server and client VSYNC signals, such that the video frame of the near worst case scenario is received, decoded, and paced in the display buffer for streamout to the client display. Determining the proper timing offset is further described in relation to FIGS. 8A-8B.

As previously described, the adjustment to the timing offset between the server and client VSYNC signals may be achieved by tuning the server VSYNC signal or client VSYNC signal for one or more frame periods. For example, the adjustment to the timing offset may be performed by adjusting the frequency of the corresponding server or client VSYNC for one or more frame periods. In particular, the frequency of a corresponding server or client VSYNC signal may be adjusted by removing or adding a raster scan line for a vertical blanking interval of a corresponding frame period, or by overclocking or under-clocking a corresponding pixel clock of the server or client.

In some embodiments, rather than first removing drift between the server and client VSYNC signals and then establishing the proper offset between the VSYNC signals, instead the timing offset is maintained by more frequently manipulating the frequency of the server VSYNC signal or client VSYNC signal to adjust the relative timing offset. That is, the adjustment to the offset between the server VSYNC signal and the client VSYNC signal is continuously determined based on a near worst case decode timestamp indicated by a corresponding histogram, wherein histograms may be generated over shortened time periods for frequent determination and manipulation of the timing offset.

FIG. 6C is a flow diagram 600C illustrating another method for aligning VSYNC signals when performing tuning of the VSYNC signals between a cloud gaming server and a client for purposes of reducing one-way latency, in accordance with one embodiment of the present disclosure. As previously described, alignment includes synchronizing the frequencies and/or adjusting the offset between a server VSYNC signal and a client VSYNC signal, such as for purposes of reducing one-way latency. In particular, FIG. 6C provides additional detail to adjusting of the relative timing between the server and client VSYNC signals outlined in operation 610 of FIG. 6A.

Specifically, alternative methods for determining drift between server and client VSYNC signals are used for synchronization, as outlined in operations 620, which includes operations 621 and 623. In particular, at 621 the method includes periodically sending timing information from the server to the client. For example, the timing information as determined from a server pixel clock may include a start of a corresponding frame period, length of time for a corresponding frame period, scan-out timing of a video frame to an encoder, flip time of a corresponding video frame, etc.

Also, at 623, the timing information is analyzed to determine drift between the server VSYNC signal and the client VSYNC signal. For example, drift may be calculated by analyzing the variance between timing information generated at the server and the client based timing of the receipt of the server based timing information. In other embodiments, drift may be measured for server frame periods used for generating video frames, wherein the drift of the server frame period is measured with reference to a client VSYNC signal, or some multiple thereof. Also, drift may be measured between a plurality of connected devices, which may be independent peer devices, or server and client devices, arranged in peer-to-peer architectures, or server/client architectures, or some combination thereof.

Once the drift is determined, the frequency of the server VSYNC signal or the client VSYNC signal may be adjusted to compensate for the drift, wherein the adjustment may be applied over a period of time. As previously described, the measured drift between the frequencies of the server and client VSYNC signals may be used to adjust the VSYNC signal at the server or client for a period of time. Tuning of the VSYNC signal may include removing or adding a raster scanline for a vertical blanking interval of a corresponding frame period, or may include overclocking or under clocking a corresponding pixel clock of the server or client.

After compensating for the drift between the frequencies of the server and client VSYNC signals, the relative phase or offset between the server and client VSYNC signals may be adjusted based on timestamp information, wherein the adjustment may be applied to the server VSYNC signal or the client VSYNC signal. In particular, adjusting the relative phase or offset is performed based on timestamp information associated with the server generated video frames.

In particular, at 611 the timestamp information is sent from the server to the client. In embodiments, the timestamp information is sent with the plurality of video frames, or sent separate from the plurality of video frames. The operation 611 of flow diagram 600C was previously described in relation to flow diagram 600B of FIG. 6B. For example, the timestamp information as determined by the server pixel clock may indicate the timing of a corresponding occurrence of the server VSYNC signal used for scanning the corresponding video frame to an encoder (e.g. during scan-out). In another implementation, the timestamp information may indicate the timing for a corresponding flip time of the corresponding video frame.

As previously described, the timestamp information is used by the client to create decode timestamps, each indicating the availability for display at the client of a corresponding video frame, relative to its desired display time as specified by the server (the timestamp). The decode timestamp may be derived by subtracting the time at the client, indicating completion of decoding for a corresponding video frame, from the corresponding server based timestamp information. Normalization may also be applied when generating the decode timestamp.

Because drift may be performed without using timestamp information, for example to generate multiple histograms, one histogram at a particular time is generated and used for adjusting the timing offset between server and client VSYNC signals. That is, the histogram may be updated by expanding the decode timestamps included within the histogram, but multiple histograms over different time periods need not be generated. In particular, at 613-A, the histogram is built based on the decode timestamps. The operation 613-A of flow diagram 600C is similar to operation 613 previously described in relation to flow diagram 600B of FIG. 6B. For example, the decode timestamp information is binned for the video frames received and decoded by the client over time to provide a distribution of the timing of the completion of decode by the client relative to desired display times as specified by the server (e.g. server timestamp information).

At 617, the relative phase or offset between the server and client VSYNC signals may be adjusted based on timestamp information, wherein the adjustment may be applied to the server VSYNC signal or the client VSYNC signal. The operation 617 of flow diagram 600C was previously described in relation to flow diagram 600B of FIG. 6B. In particular, the adjustment to the offset is determined based on a near worst case decode timestamp indicated by the histogram that is continually updated. For example, the timing offset may be determined such that a predetermined number of threshold (e.g., 99.99 percent) of received video frames arrive at the client in time to be decoded and displayed at the next appropriate occurrence of the client VSYNC signal. Determining the proper timing offset is further described in relation to FIGS. 8A-8B.

Adjustment to the timing offset between server and client VSYNC signals is performed by tuning the server or client VSYNC signal for one or more frame periods. For example, the adjustment may be performed by adjusting the frequency of the server or client VSYNC signal for one or more frame periods by removing or adding a raster scanline for a vertical blanking interval of a corresponding frame period, or by overclocking or under clocking a corresponding pixel clock of the server or client.

In some embodiments, the drift operation 620 of FIG. 6C is not performed when establishing the proper offset between the VSYNC signals. Instead the timing offset is maintained by more frequently manipulating the frequency of the server VSYNC signal or client VSYNC signal to adjust the relative timing offset. That is, the adjustment to the offset between the server VSYNC signal and the client VSYNC signal is continuously determined based on a near worst case decode timestamp indicated by a corresponding histogram, wherein the adjustment to the offset may be performed at shortened interval periods.

Figure 7:
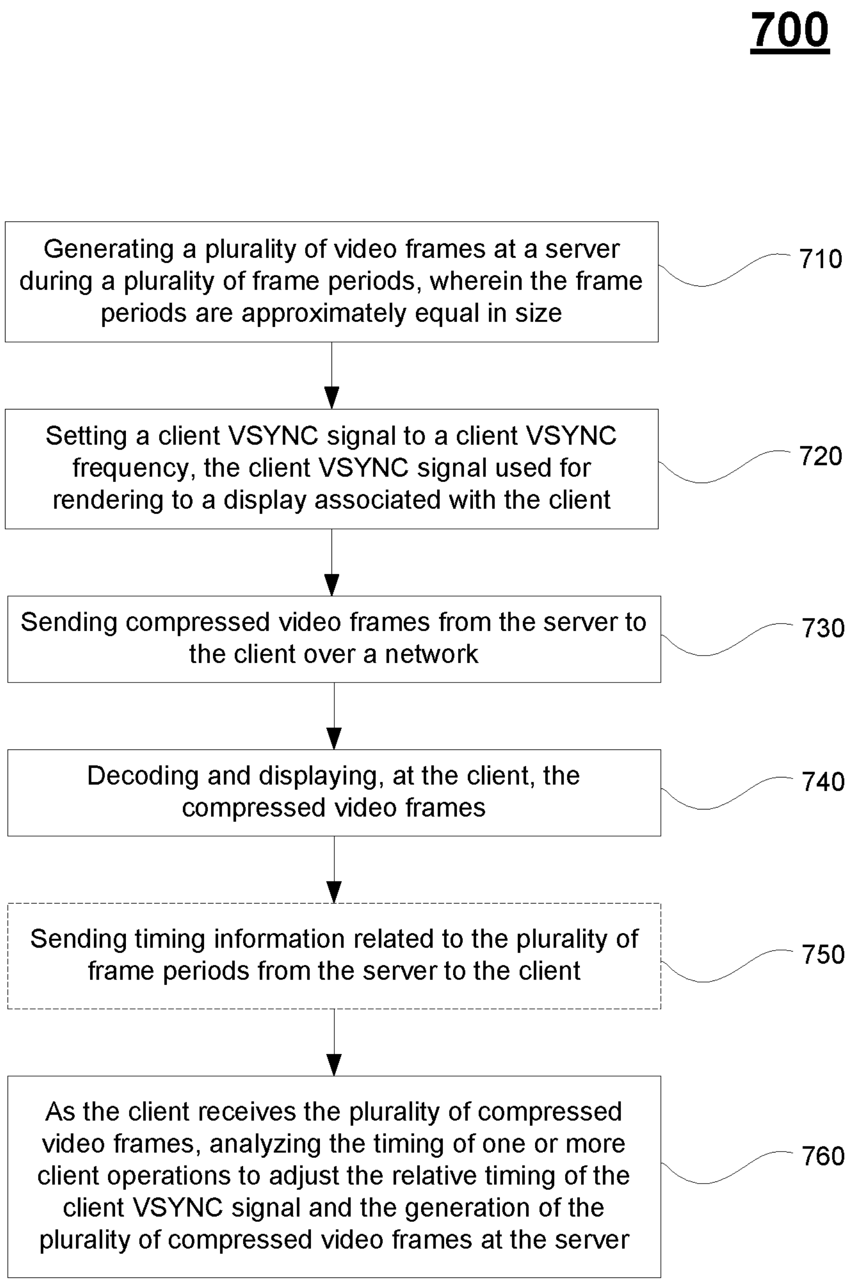
FIG. 7 is a flow diagram illustrating a method for tuning a client VSYNC signal in relation to the generation of compressed video frames at a server, wherein video frames are generated during similarly sized frame periods, in accordance with one embodiment of the present disclosure.

With the detailed description of the various client devices 210 and/or the cloud gaming network 290 (e.g., in the game server 260) of FIGS. 2A-2D, flow diagram 700 of FIG. 7 illustrates an alternative method for reducing one-way latency between a cloud gaming server and a client, in accordance with one embodiment of the present disclosure. In particular, flow diagram 700 illustrates a method for tuning a client VSYNC signal in relation to the generation of compressed video frames at a server, wherein video frames are generated during similarly sized frame periods, in accordance with one embodiment of the present disclosure.

At 710, the method includes generating a plurality of video frames at the server during a plurality of frame periods, where the frame periods are approximately equal in size. The cloud gaming server may turn off, or not implement, a server VSYNC signal, as there is no need for a display at the server when streaming video frames to a client, in one embodiment. Instead, the server may utilize a regular (e.g. periodic) or nearly regular signal that is used for timing during the generation of game rendered video frames when processing a video game. For example, the server may use frame periods that are approximately equal in size instead of using a server VSYNC signal. Generation of a plurality of video frames occurs within a plurality of frame periods, such that a game rendered video frame is generated within a corresponding frame period. The server may be executing a video game in a streaming mode, such that the CPU of the server executes the video game responsive to input commands from a user to generate the game rendered video frames using a graphics pipeline.

At 720, the method includes setting, at a client, a client VSYNC signal to a client VSYNC frequency. The client VSYNC signal is used for rendering to a display associated with the client. Timing for rendering and displaying video frames at the client may be referenced to the client VSYNC signal, such that a corresponding video frame can be displayed beginning with a corresponding occurrence of a client VSYNC signal.

At 730, the method includes sending a plurality of compressed video frames based on the plurality of video frames from the server to the client. In particular, the game rendered video frames are delivered (e.g. during scan-out 402) to an encoder at the server, wherein the encoder is configured to perform compression on the game rendered video frames. The plurality of compressed video frames is transmitted (e.g. streamed) to the client for display, such as during a gaming session. Transmission of the compressed video frames need not being in alignment with a frame period, such that transmission may being as soon as a portion of a corresponding video frame, or when the complete video frame, has been encoded.

At 740, the method includes decoding and displaying, at the client, the plurality of compressed video frames. As previously described, the client receives and decodes the plurality of compressed video frames. For example, the client may receive one or more encoded slices for a corresponding compressed video frame, which are then decoded. The decoded video frame is placed into a display buffer. During decoding the decoded slices may be rendered for display, wherein rendering includes generating screen slices (e.g. scanlines) from the decoded slices of a corresponding video, which are then streamed to a display of the client. For example, pixel data of decoded slices of a corresponding video frame may be placed into the proper addresses of the display buffer for streaming (e.g. scanline by scanline) to the display.

At 750, the method includes sending timing information related to the plurality of frame periods from the server to the client. The timing information may indicate when each of the frame periods begin at the server. Because the frame periods are approximately equal, the timing for one frame period (e.g. server timestamp), as delivered to the client, allows the client to track timing for each of the frame periods (e.g., periodically adding a frame period to the last calculated timestamp). In that manner, the client is able to correlate timing information, either received from the server or calculated at the client, to corresponding video frames received at the client. The timing information as determined at the client may give an indication of the desired display timing of the corresponding video frame as determined by the video game executing at the client, such as when the video frame has been generated, and is theoretically scanned to or streamed to a local display—without transmission over a network.

At 760, the method includes analyzing the timing of one or more client operations to adjust the relative timing of the client VSYNC signal and the generation of the plurality of compressed video frames at the server, as the client receives the plurality of compressed video frames. In particular, the server frame period (e.g. duration) or the client VSYNC signal may be manipulated to adjust the relative timing offset of the server frame periods with regards to the client VSYNC signal (or some multiple thereof).

For example, drift between the client calculated server frame periods and the client VSYNC signal may be determined. Compensation for the drift may be applied to the server frame period or the client VSYNC signal for synchronization. For example, at the client, the frequency of the client VSYNC signal may be tuned by removing or adding a raster scanline for a vertical balancing interval of a corresponding frame period, wherein the VSYNC signal may be adjusted for a period of time. Also, tuning may include overclocking or under clocking a pixel clock of the client. In addition, to adjust the relative offset, one or more histograms may be built at the client o give an indication of when decoded video frames are available at the client, relative to when the video frames were generated at the server (e.g. desired display time). The histogram may be built using the same techniques as previously described, with slight modification such as using the client determined frame periods to indicate when the video frames are generated and intended for display.

Figure 8A:
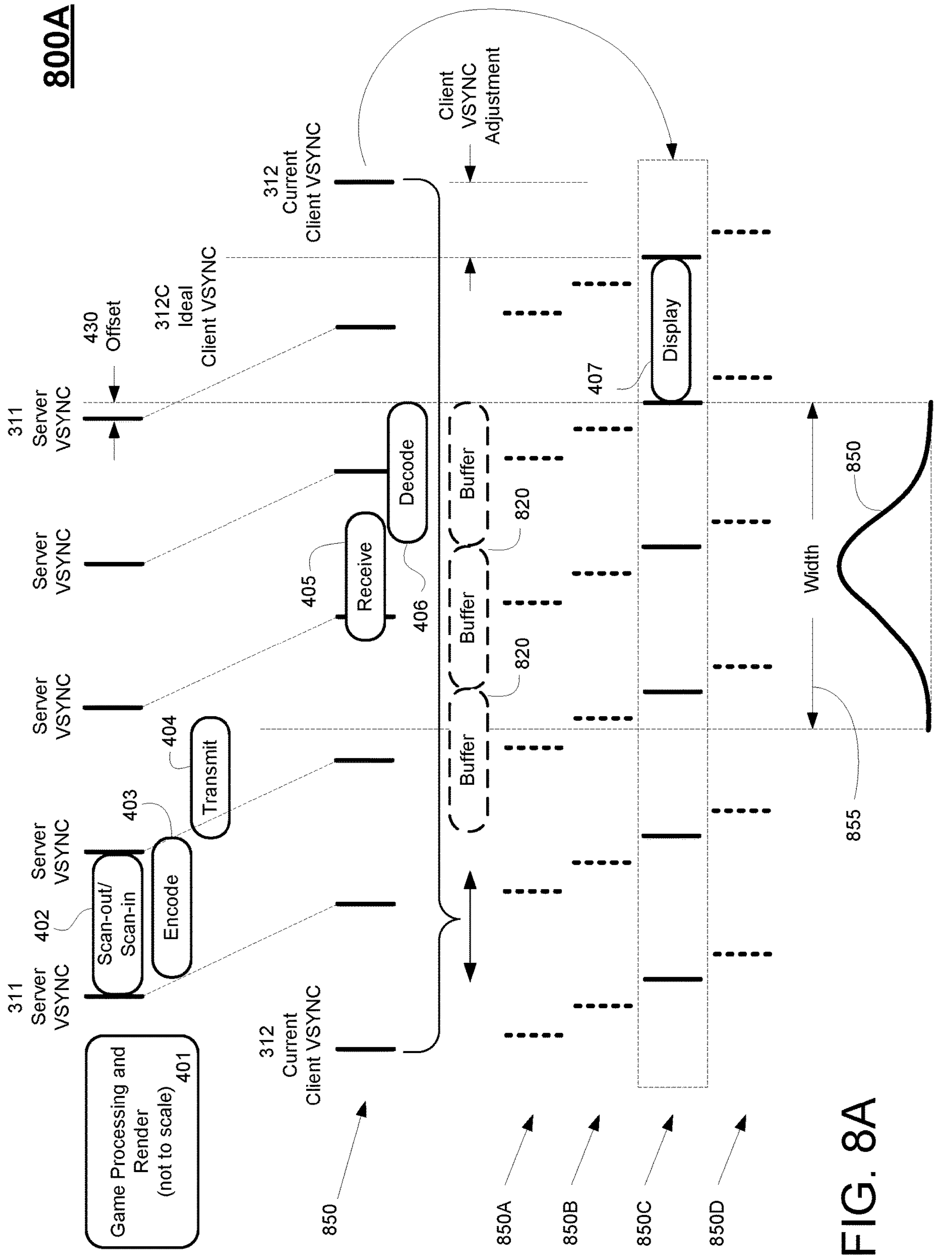
FIG. 8A is a diagram illustrating the building of a histogram providing the distribution of timing of the completion of the decode by the client relative to the desired display time as specified by the server, the histogram configured for determining an adjustment to the offset between VSYNC signals at the server and client, in accordance with one embodiment of the present disclosure.

FIG. 8A is a diagram 800A illustrating the building and use of a histogram 850 providing the distribution of decode timestamps for video frames, indicating the availability for display at the client of the video frame relative to its desired display time as specified by the server, as previously described, wherein the histogram is configured for determining an adjustment of the offset between VSYNC signals at the server and client, in accordance with one embodiment of the present disclosure. As shown, video frames are generated at the server (operation 401), scan-out is performed on the game rendered video frames to an encoder (operation 402) for compression (operation 403), and transmitted to the client (operation 404). The client receives the encoded video frames (operation 405), decompresses the encoded video frames (operation 406), and renders the video frames for display (e.g., translates the decoded video frames into scanlines in operation 407).

As previously described, server based timestamp information is delivered in association with the compressed/encoded video frames to the client for purposes of building one or more histograms used for determining the offset; the timestamp information gives the desired display time as specified by the server, which may not be sending a compressed video frame for each frame period. In particular, the histogram may contain decode timestamps, which indicate the availability for display at the client of a video frame, relative to its desired display time as specified by the server (e.g. server based timestamp information). As the server timestamps and client timestamps may be defined by their individual clocks, which are not synchronized, it may be beneficial to normalize the decode timestamps. For example, normalization may include subtracting the value of the first decode timestamp from all decode timestamps; this results in an initial decode timestamp of zero, and all subsequent timestamps are relative to it.

As shown in FIG. 8A, the built histogram 850 can be used to determine the proper offset between a server VSYNC signal and a client VSYNC signal. As previously described, the histogram provides for a distribution of decode timestamps, which indicate availability for display relative to desired display time. A VSYNC offset 430 between server and client exists such that a predetermined number or threshold (e.g., 99.99 percent) of received video frames arrive at the client and are decoded in time to be displayed at the next appropriate occurrence of the client VSYNC signal; the remaining number (e.g. 0.01 percent) arrive too late for display and may be dropped, in one embodiment. In other words, the VSYNC offset 430 accommodates for a near worst case latency when receiving, decoding and displaying rendered video frames. The encode 403, transmit 404, receive 405 and decode 406 in FIG. 8A show a near-worst frame (e.g. $99.99^{th}$ percentile); if the proper VSYNC offset 430 has been established then there will be no margin between the decode of this frame and its display. One or more client buffers 820 may be implemented to accommodate for video frames having lower decode timestamps (e.g. indicating the lowest one-way latency), such that the encode 403, transmit 404, receive 405, and decode 406 are binned early in the histogram (e.g. below the $25^{th}$ percentile). In this specific example four buffers are needed, three for the frames as they are decoded (the three Buffers 820) and one for the currently displayed frame (not shown).

A series of theoretical timing diagrams 850A through 850D are provided for the client VSYNC signal 312, wherein timing diagram 850C (and accompanying display 407) illustrates the ideal client VSYNC 312C. Since there is no direct synchronization of clocks or timestamp (e.g., through a third party timing mechanism, such as a universal clock), the offset 430 is not directly set; instead, the current client VSYNC 312 may be adjusted, using the near-worst case timing information in the histogram, to become the ideal client VSYNC timing 312C, as previously described. Alternatively the server VSYNC may be adjusted to create the proper offset, as previously described.

The server timestamp information is collected and/or received by the client. As previously described, the timestamp information may include the time when a corresponding video frame was generated (e.g., flip-time, when scan-out occurred, the occurrence of a server VSYNC signal when scan-out occurred, etc.). Additional information may be collected at the server and/or client and used for building or interpreting the histogram, and is referred to as "histogram information," as more fully described below.

On the server side, additional histogram information may include encode time statistics, such as: the number of scene changes; the mean and/or standard deviation of the encode time for I-frames; and the mean and/or standard deviation of the encode time for P-frames. The encode time statistics may be delivered as a periodic message from the server to the client. In addition, the histogram information may include the time to prepare an encoder slice by the encoder, which may be delivered as a periodic message from the server to the client. Also, the histogram information may include actual server side VSYNC timing and targeted VSYNC timing, which may be added to packet headers. Further, the histogram information may include an average number of slices per I-frame vs P-frames.

At the server, the histogram information may include a round trip time (RTT) measurement to derive the one-way network latency for sending an encoded slice (e.g., encoder slice that is compressed). The RTT measurement may be used to determine the transmission time needed to send a packet to the client (e.g., without any further processing performed by the client, such as decode and render). For example, the RTT may be determined by sending a heartbeat packet from the server to the client, wherein the packet includes a unique identifier. The client sends a heartbeat response back to the server along with the unique identifier so the server can calculate the RTT. The one-way network latency is approximately half the RTT. By periodically measuring the RTT, network or transmission jitter may be analyzed and/or determined (e.g., spikes in RTT) when used to build the histogram. For example, the measured one-way network latency as measured through RTT may be used as the transmission time for all video frames received until the next RTT measurement.

At the client, additional histogram information may include decode time for each received encoded video frame. In addition, the histogram information may include the render preparation time for each decoded video frame, wherein the render preparation may include converting the decoded video frame slices into scanlines or screen slices.

In addition, at the server additional histogram information may include the maximum send rate which defines the total network throughput (e.g., bandwidth) that the server thinks is available to the client. This may be used to determine the maximum rate that encoder slices of encoded video frames can be sent out. The maximum rate will fluctuate based on the stability of the network connection to the client, and the offset can be dynamically adjusted to accommodate the fluctuation. Further, the maximum send rate can be adjusted independently of encoder parameters, such that slices can be sent out quicker if the encoder is configured to not produce slices at the maximum send rate.

For example, maximum bandwidth or maximum send rate may be determined by means of a feedback mechanism from the client. One way to perform this is to have the client return the number of packets it has received over a range of incremental sequence IDs (identifiers), or a range of frames. For example, the client may report something like, 145 of 150 frames received for sequence IDs 100 to 250. The server calculates the packet loss, knows the amount of bandwidth that was being sent during that sequence of packets, and can determine what the client's maximum bandwidth is. The client cannot make this determination because the amount of bandwidth being sent is constantly fluctuating due to variable bitrate, scene complexity, etc. That is, the client does not know if the server is sending the maximum bandwidth the client can handle at any given moment. For example, the maximum bandwidth may be 15 Mbps (megabits per second), but the scene complexity may be low due to the user being on a menu (static video frames having low complexity and no variation between frames). As a result, only 2 Mbps is being sent. Hence, if the client reports 0% packet loss, this does not tell the server if the client can still handle 15 Mbps. Hence, only when the server is sending the maximum bandwidth can the true maximum bandwidth be determined.

Figure 8B:
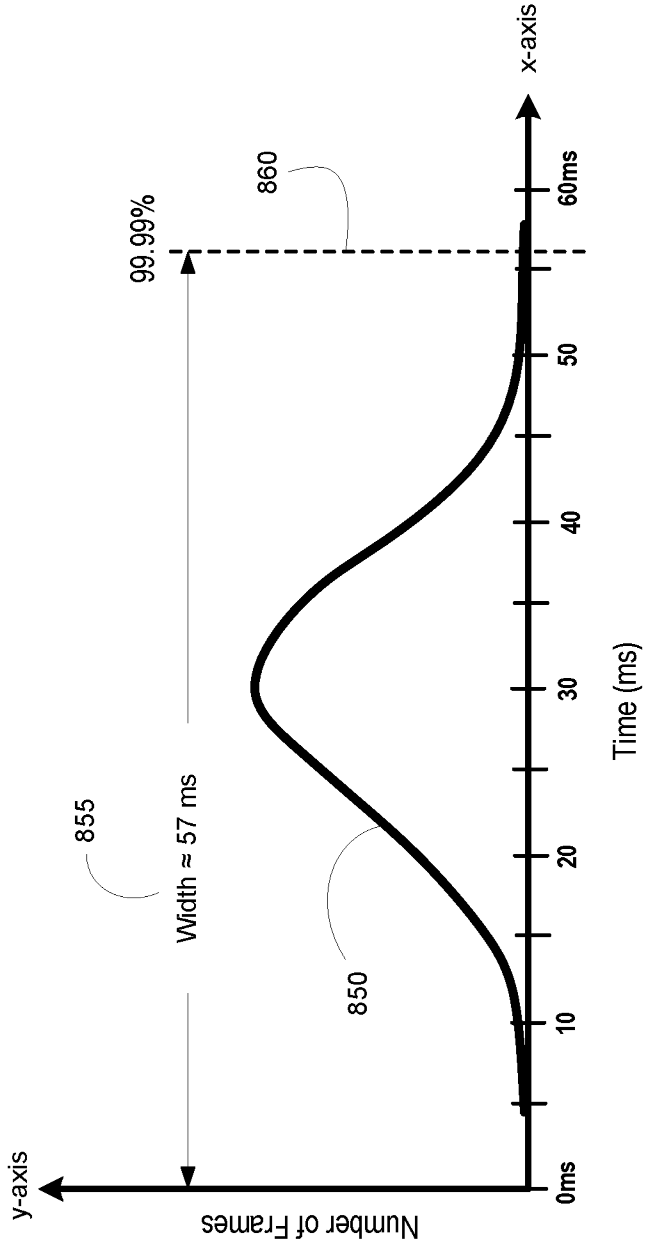
FIG. 8B is a diagram of a histogram providing the distribution of timing of the completion of the decode by the client relative to the desired display time as specified by the server, the histogram configured for determining an adjustment to the offset between VSYNC signals at the server and client, in accordance with one embodiment of the present disclosure.

FIG. 8B illustrates histogram 850 showing the distribution of decode timestamps. In this case it is normalized in such a way that the numerically smallest decode timestamp is assigned a value of zero (e.g., the smallest decode timestamp is subtracted from all decode timestamps), in one embodiment. In particular, the x-axis shows time in milliseconds for corresponding decode timestamps, such as between 0 and beyond 60 milliseconds (ms). The y-axis shows the number of video frames received by the client for a corresponding decode timestamp.

Purely for illustration, the decode timestamps may vary over approximately a 60 ms (millisecond) range, and indicate 60 ms of variability in the availability for display at the client of video frames relative to their desired display time as specified by the server. That is, some frames may be available for display approximately 60 ms earlier or later relative to other frames. Variability in availability of specific frames for display may be due to variances in server and client processing, scene complexity, variances in network paths, packet delay variance, and other factors. By analyzing worst or near-worst case decode timestamps, it is possible to determine the ideal relationship between server VSYNC signal and client VSYNC signal. That is, an ideal relative offset between the timing of the client VSYNC signal and the server VSYNC signal may be determined to maximize the number of received and decompressed video frames available to be displayed at the appropriate client VSYNC signal, as previously described. In that manner, diagram 800B shows a width of the distribution of decode timestamps 755 (e.g., approximately 57 ms) within which 99.99 percent of the video frames received by the client would arrive and be decoded in time for display at the next appropriate occurrence of the client VSYNC signal.

This width of the distribution of decode timestamps 755 (including all decode timestamps up to the near-worst case but excluding those beyond it) can be used to determine the required amount of overall buffering needed for decoded video frames. If the width 755 is less than a frame period, then two buffers are required, as one is needed for the frames as they are decoded, and one is needed for display. If the width is greater than a frame period but less than two frame periods, then three buffers are needed, and so on. In our specific example of a width of 57 ms, if a frame period is 16.67 ms then five frame buffers are required. The decode timestamp indicates the availability of the decoded frame relative to the desired display time, so video frames with lower decode timestamps are held in buffers for longer periods of time prior to display, and video frames with higher decode timestamps are held in buffers for shorter periods of time prior to display.

In one embodiment, the histogram is dynamically regenerated. In another embodiment, the amount of frame buffering is dynamically set by the client over time. In yet another embodiment, frames that arrive and are decoded too late to be displayed at the desired display time are skipped (i.e. not displayed).

Figure 9:
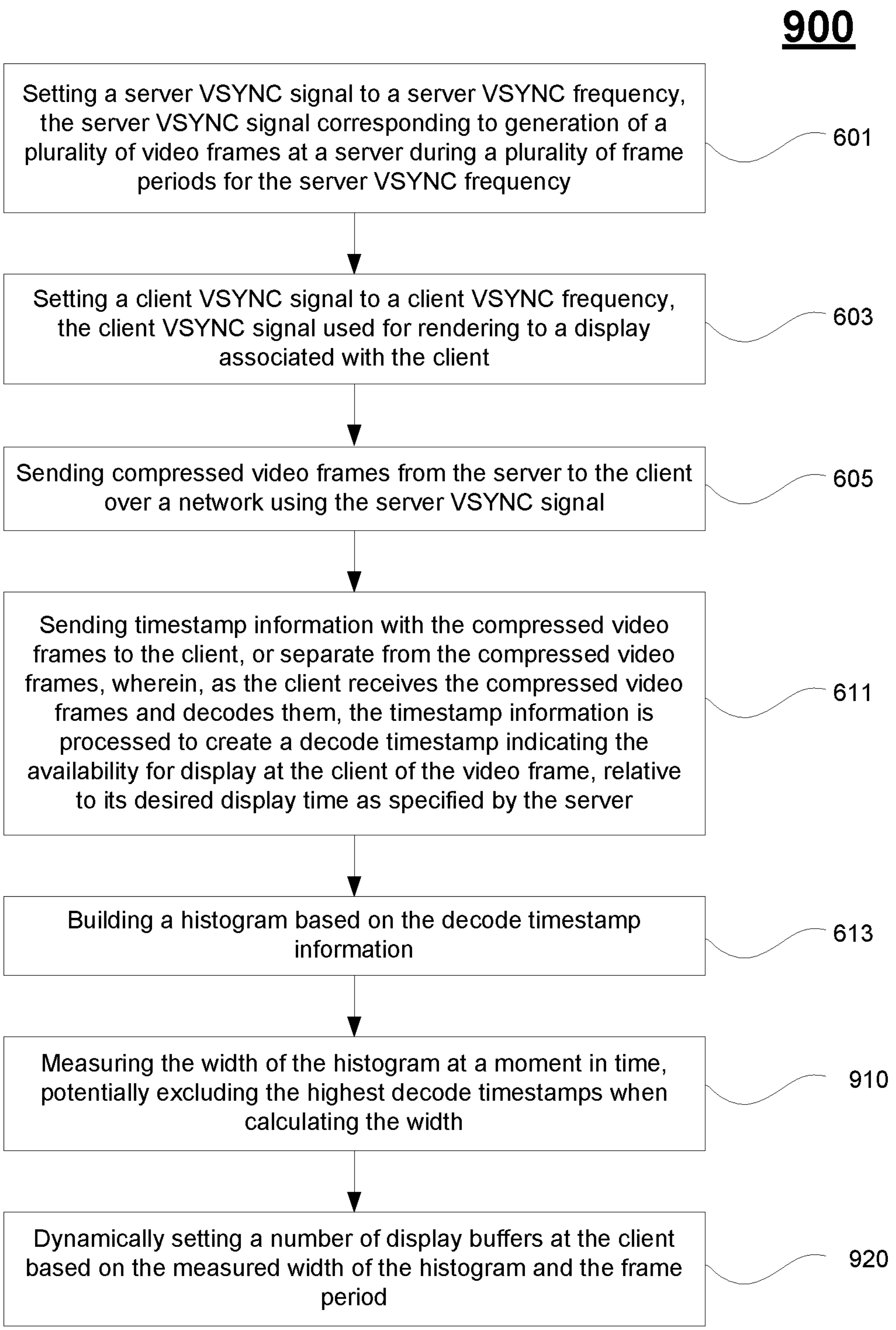
FIG. 9 is a flow diagram illustrating a method for building of a histogram providing the distribution of timing of the completion of the decode by the client relative to the desired display time as specified by the server, the histogram configured for determining the required amount of buffering of decoded video frames at the client.

With the detailed description of the various client devices 210 and/or the cloud gaming network 290 (e.g., in the game server 260) of FIGS. 2A-2D, flow diagram 900 of FIG. 9 illustrates a method for building a histogram providing the distribution of elapsed timing for video frames between the time they are generated at a cloud gaming server and the time they arrive and/or are ready for display at a client, wherein the histogram is configured for determining a buffer size at the client, in accordance with one embodiment of the present disclosure. As previously described, the histogram is also configured for determining a proper offset between VSYNC signals at the server and the client.

The operations 601, 603, 605, 611, and 613 were previously described in relation to flow diagrams 600A of FIG. 6A and 600B of FIG. 6B and disclose the adjustment of the relative timing between server and client VSYNC signals (e.g., synchronize frequencies and adjust timing offset or phase). In summary, at 601, the method includes setting, at a server, a server VSYNC signal to a frequency, the server VSYNC signal corresponding to generation of video frames at the server during frame periods of the server VSYNC signal. At 603, the method includes setting, at a client, a client VSYNC signal to correspond to the frequency, the client VSYNC signal used for rendering to a display associated with the client. At 605, the method includes sending compressed video frames based on the video frames being generated from the server to the client over a network using the server VSYNC signal.

At 611, the method includes sending timestamp information associated with the compressed video frames to the client. For example, the timestamp information may be sent with or separate from the compressed video frames, wherein the timestamp information gives an indication of the desired display timing of a corresponding video frame as determined by the video game, such as when theoretically scanning or streaming to a local display—without transmission over a network. As the client receives and decodes the compressed video frames, the timestamp information is processed to create a decode timestamp indicating the availability for display at the client of the corresponding video frame, relative to its desired display time (e.g. server timestamp) as specified by the server. In one embodiment, the decode timestamp may be normalized as the server and client timing may be defined by corresponding individual clocks, which are not synchronized. A full discussion on timestamp information was provided in relation to FIGS. 6B-6C, and 8A-8B, and is equally applicable in relation to FIG. 9.

At 613, the method includes building a histogram based on the decode timestamp measured and/or calculated at the client. For example, a corresponding histogram may be created by binning the decode timestamp information related to compressed video frames received and decoded at the client over a period of time. Because the decode timestamps indicates indicating the availability for display at the client of video frames, relative to their desired display time (e.g.

server timestamp) as specified by the server, the histogram also provides a distribution of the timing of the completion of decode of video frames received by the client relative to the desired display time as specified by the server (e.g. server timestamp information). A full discussion on timestamp information was provided in relation to FIGS. 6B-6C and 8A-8B, and is equally applicable in relation to FIG. 9.

At 910, the method includes measuring the width of the histogram at a particular point in time. For example, the width of the distribution of decode timestamps in the histogram may be measured such that a predetermined number or threshold (e.g., 99.99 percent) of received video frames arrive at the client in time to be displayed at the next appropriate occurrence of the client VSYNC signal 312 (to be clear, the remaining 0.01 percent of received video frames are not included when measuring the width). In particular, the width of the histogram may be used for setting the amount of frame buffering required by the client at a particular moment in time. As such, at 920, the method dynamically sets a number of display buffers at the client based on the width of the histogram and the frame period of the synchronized server and client VSYNC signals, wherein the histogram 750 is generated at a particular point in time. As previously described, if the width is less than a frame period, then two frame buffers are needed, etc. In that manner, video frames with lower decode timestamps are held in buffers for longer periods of time, whereas video frames with higher decode timestamps are held in buffers for shorter periods of time.

Figure 10:
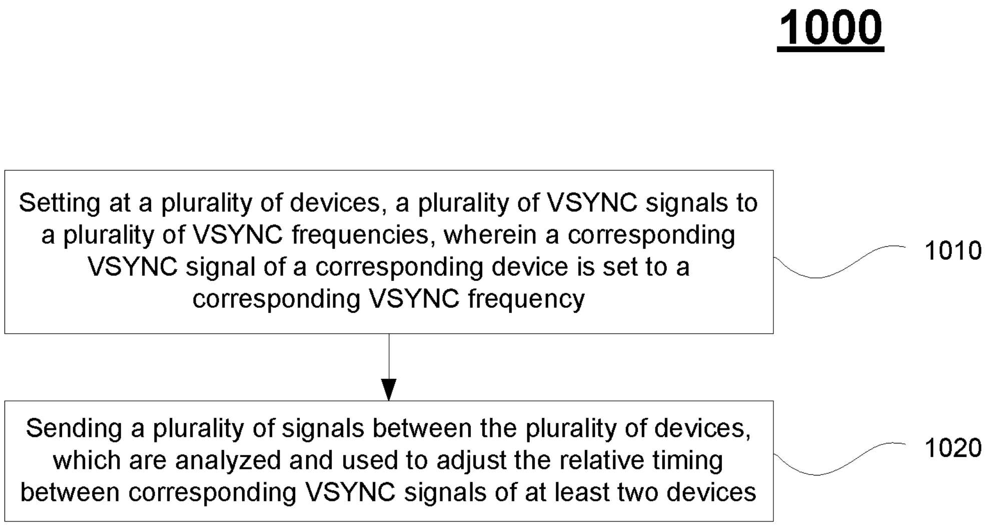
FIG. 10 is a flow diagram illustrating a method for adjusting the relative timing between VSYNC signals between two or more devices, in accordance with one embodiment of the present disclosure.

With the detailed description of the various client devices 210 and/or the cloud gaming network 290 (e.g., in the game server 260) of FIGS. 2A-2D, flow diagram 1000 of FIG. 10 illustrates a method for adjusting the relative timing between VSYNC signals between two or more devices, in accordance with one embodiment of the present disclosure. In particular, flow diagram 1000 may be used to compensate for drift and/or to adjust the offset or phase between two or more VSYNC signals of corresponding devices.

At 1010, the method includes setting, at a plurality of devices, a plurality of VSYNC signals to a plurality of VSYNC frequencies, wherein a corresponding device VSYNC signal of a corresponding device is set to a corresponding device VSYNC frequency. That is, each of the devices sets a corresponding VSYNC signal using a corresponding pixel clock. Further, the frequencies may be similar, such as being set to the same apparent frequency, though their actual frequencies may be different due to variances between the various pixel clocks. These VSYNC signals may be used for the generation of video frames (e.g. at a server in a server/client architecture) and/or the display of video frames (e.g. at a client in a server/client architecture. Also, these VSYNC signals may be used for both the generation of video frames and the display of video frames, such as at devices in a peer-to-peer architecture, where each device is executing a video game locally, but the timing of their execution and display of video frames may be coordinated.

At 1020, the method includes sending a plurality of signals between the plurality of devices, which are analyzed and used to adjust the relative timing between corresponding device VSYNC signals of at least two devices. Relative timing may be adjusted between devices configured in a server/client architecture, or configured in a peer-to-peer architecture. For example, the signals may include server timestamp information, or server timing information, that give an indication as to when a corresponding video frame is intended for display by the server, as previously described. In that manner, the VSYNC signals of the plurality of devices may be synchronized (e.g. synchronizing the frequencies of the VSYNC signals) by determining drift between at least two VSYNC signals. Also, a timing offset and/or timing phase may be adjusted between at least two VSYNC signals.

In particular, at least two of the devices may be configured in a server/client architecture, in one embodiment. In another embodiment, the devices are arranged in a mult-tenant configuration (e.g. one server for multiple client devices). For example, a first device may be a server device, wherein a server VSYNC signal is set to a server VSYNC frequency. The server VSYNC signal corresponds to generation of a plurality of video frames during execution of an application at the server device during a plurality of frame periods for the server VSYNC frequency. A plurality of compressed video frames is sent from the server device to each of the remaining devices (e.g. client devices) in the plurality of devices over a network based on the server VSYNC signal. For example, the server VSYNC signal provides timing for the generation and encoding of the video frames at the server. The compressed video frames being based on the video frames being generated by the server device. Each of the receiving devices (e.g. the remaining devices) decode and display the compressed video frames that are received. The display of the decoded video frames may be synchronized between each of the receiving devices.

In particular, the relative timing may be adjusted between devices to compensate for drift and/or to adjust a timing offset or phase between VSYNC signals of the devices. Drift and the adjusting of the timing offset or phase may be determined using the techniques previously described in relation to FIGS. 6A-6C, 7, and 8A-8B. Adjusting the relative timing between VSYNC signals of two devices may occur at either device, and may include adjusting frequency by removing or adding a raster scanline for a vertical blanking interval of a corresponding frame period of a corresponding device VSYNC signal for a corresponding device, or overclocking or underclocking a corresponding clock of a corresponding device.

In particular, at least two of the devices may be configured in a peer-to-peer architecture, in one embodiment. For example, each of the devices may be independent peer devices. That is, none of the devices is a server device. In that manner, the devices may be configured for peer-to-peer gaming. Each of the devices is generating a plurality of video frames by processing the same video game. The independent peer devices may be operating in a multi-player mode for a specific video game using back-end server support that controls a multi-player gaming session. The back-end server may enable state sharing between the devices by managing state data for each of the user in the multi-player gaming session. State data may include game state data that defines the state of the game play (of a gaming application) for a corresponding user at a particular point. For example, game state data may include game characters, game objects, game object attributes, game attributes, game object state, graphic overlays, etc. In that manner, objects and characters may be inserted into each of the gaming environments of the users participating in the multi-player gaming session, such that the game play for each user is customized to each user via state sharing. Also, the game play for each user may be synchronized based on the state sharing. That is, video frames being displayed at each of the devices may be synchronized as reflected in the synchronized game play. In that manner, one user may not gain an advantage by continuously receiving and displaying video frames on a corresponding device sooner than the video frames of game plays of other users. Alternatively, no back-end server is involved, in which case the VSYNC relationship between the peers is optimized for minimal latency between receiving control or state information from the other peer and display of a video frame that uses the information received from the other peer.

Figure 11A:
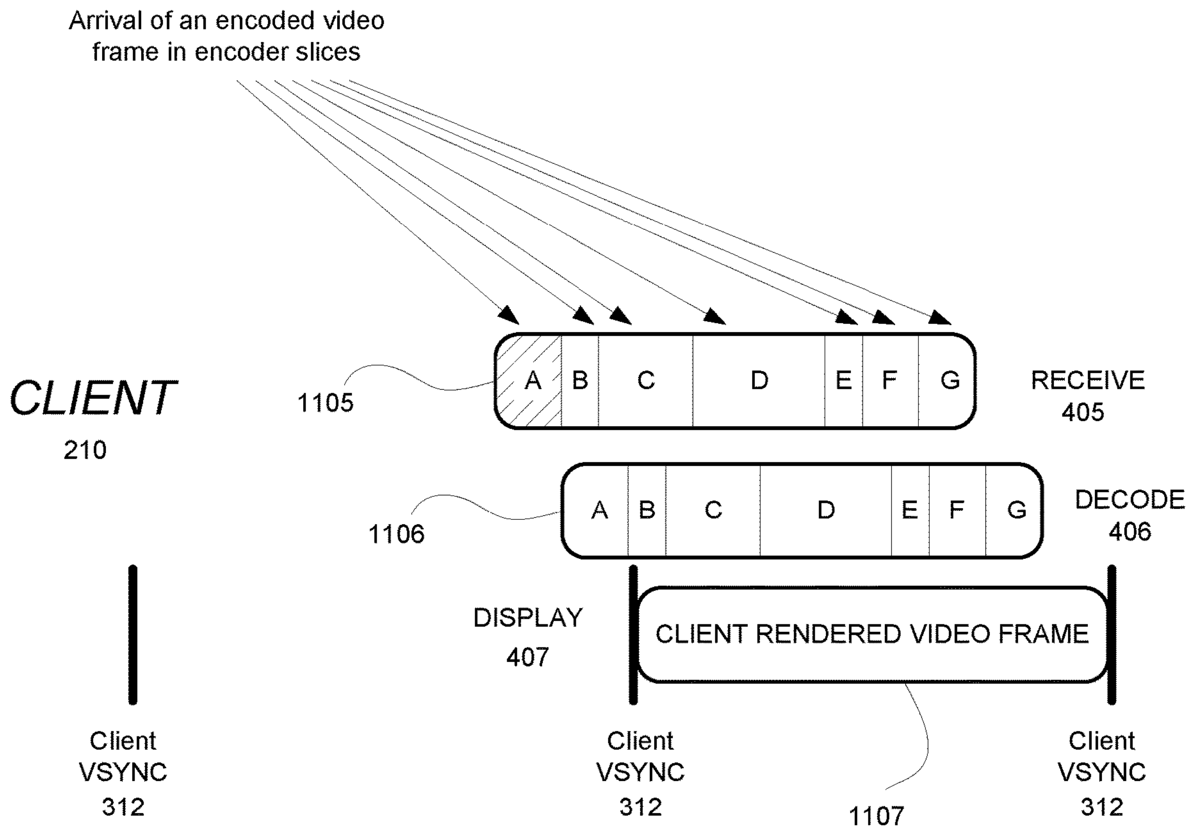
FIG. 11A illustrates the overlapping of receiving, decoding, and the rendering of decompressed video frames for display at a client, in accordance with one embodiment of the present disclosure.

FIG. 11A illustrates the overlapping of receiving, decoding, and rendering of decompressed video frames for display at a client 210, in accordance with one embodiment of the present disclosure. In particular, one-way latency between a server (not shown) and a client 210 in cloud gaming applications may be reduced by overlapping operations of receiving, decoding, and displaying of a particular video frame.

For example, the client in cloud gaming applications receives and decodes video frames. In particular, the client receiving an encoded video frame 1105 at receive operation 405, wherein a server executes a video game to generate a game rendered video frame which is then encoded at an encoder at the server and delivered to the client as the encoded video frame 1105. The encoded video frame 1105 includes one or more encoded slices that are compressed by the encoder at the server. The client includes a decoder configured for decoding the one or more encoded slices in the encoded video frame at decode operation 406. In one embodiment, the decode process begins before the corresponding video frame is fully received at the client. Because the decoder performs decode on an encoded slice-by-slice basis, the decoded video frame 1106 includes one or more encoder slices. Thereafter, the decoded video frame 1106 is then prepared for displaying, such as rendering the information in the decoded video frame 1106 into scanlines or screen slices. Thereafter, the client rendered video frame 1107 is ready for display.

One-way latency between the server and client can be reduced by having the client 210 begin the display of a video frame at operation 407 before the video frame has been completely decoded at operation 406. In particular, one or more decoded slices of a video frame may be prepared for rendering to a display before the video frame has been fully decoded. That is, the display operation at 407 overlaps the decode operation at 406. In particular, the first encoded slice (e.g., slice A) must arrive and be decoded before client scan-out begins to the display. In addition, all subsequent encoded slices must arrive and be decoded before their respective decompressed data is rendered and scanned out for display.

Further, in addition to overlapping the receiving and decoding operations at the client, the display of one or more decoded slices that are then rendered in preparation for displaying can occur even before the encoded video frame sent by the server has been fully received at the client. That is, one or more of the receive, decode, and display operations at the client may be overlapped for a corresponding video frame. Moreover, when overlapping multiple operations at both the server and the client, one or more decoded slices of a rendered video frame that are then rendered in preparation for displaying can be displayed at the client even before the scan-out operation at the server has fully completed, wherein scan-out delivers the game rendered video frame to the encoder at the server, in one embodiment.

The overlapping of display at operation 407 and decode at operation 406 may be performed on an encoder slice-by-slice basis. In that manner, an encoded slice may be displayed before one or more subsequent encoded slices have been received. In order to do that, forward error correction (FEC) data must be interleaved between encoded slices of the corresponding video frame. In particular, an encoded slice may be partitioned into one or more network packets. A FEC packet may be used to correct one or more packets associated with a slice. As such, FEC packets may be interleaved between packets of multiple slices. In that manner, forward error correction can be used earlier to correct for missing and/or corrupted packets of slices without waiting for the entire set of packets of a frame (e.g., data and FEC) to be received by the client. This provides for overlapping the decode and display operations at the client.

In one embodiment, decode timestamps may be created for each slice, indicating the availability of the slice for display at the client relative to its desired display time as specified by the server. The decode timestamp may be calculated by taking the time of completion of decode 406 of the slice at the client, subtracting the timestamp received from the server indicating ideal display time of the frame, and adding the time within the display process 407 that the decompressed slice data is used (i.e., add 0 ms if the decompressed slice data is needed immediately, add 8.33 ms if the slice data is needed halfway through the 16.67 ms frame period, and so on). It may be beneficial to normalize the decode timestamps in some way, such as subtracting the first decode timestamp from all other timestamps.

The decode timestamps may be placed in a histogram, similar to those as illustrated in FIGS. 5A-5B and 8A-8B. The worst case or near-worst case (e.g., 99.999%) decode timestamp, as determined by the histogram, can be used to adjust relative server and client VSYNC timing and thereby reduce one-way latency. If slices arrive and are decoded late, existing contents of the display buffer will be used for display, leading to visible corruption or "tearing," so a very high threshold such 99.999% is desirable, providing for 1 missed frame out of a hundred thousand video frames that are generated at server 260 and displayed at the client 210.

Figure 11B:
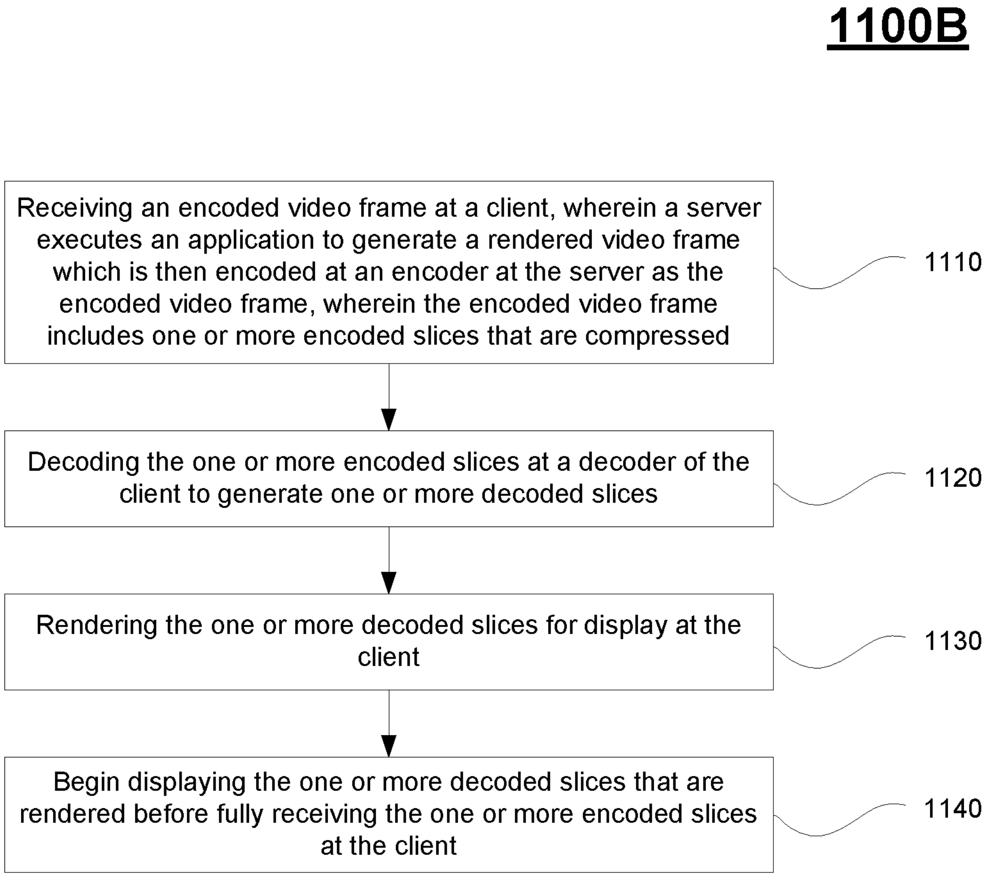
FIG. 11B is a flow diagram illustrating a method of cloud gaming wherein encoded frames are received at a client from a server and decoded and rendered for display, wherein the decoding and displaying of a video frame may be overlapped for purposes of reducing one-way latency, in accordance with one embodiment of the present disclosure.

With the detailed description of the various client devices 210 and/or the cloud gaming network 290 (e.g., in the game server 260) of FIGS. 2A-2D, flow diagram 1100B of FIG. 11B illustrates a method of cloud gaming wherein encoded frames are received at a client from a server and decoded and rendered for display, wherein the decoding and displaying of a video frame may be overlapped for purposes of reducing one-way latency, in accordance with one embodiment of the present disclosure. The ability to overlap one or more operations at the client is achieved through managing the one-way latency between the server and the client, as previously described in FIGS. 4-10. For example, relative timing between server and client VSYNC signals is adjusted to reduce and/or minimize variability in the one-way latency between the server and client.

At 1110, the method includes receiving an encoded video frame at a client, wherein a server executes an application to generate a rendered video frame which is then encoded at an encoder at the server as the encoded video frame, wherein the encoded video frame includes one or more encoded slices that are compressed. For example, the server generates a plurality of video frames using a server VSYNC signal. Each of the video frames may be sent to an encoder for compression, wherein each video frame may be encoded into one or more encoded slices. As previously described, the start of encoding for a corresponding video frame may be aligned with the server VSYNC signal. The compressed video frames are then transmitted to the client, wherein transmission need not be in alignment with the server VSYNC signal, and may begin as soon as an encoder slice or the complete video frame has been encoded. The compressed video frames are received by the client.

At 1120, the method includes decoding the one or more encoded slices at a decoder of the client to generate one or more decoded slices. In one embodiment, the decoding of the one or more encoded slices may begin before fully receiving the encoded video frame at the client. For example, the client receives one or more encoded slices for a corresponding video frame. Each of the encoded slices are then decoded and placed into a display buffer, such that the decoded video frame is placed into the display buffer.

At 1130, the method includes rendering the one or more decoded slices for display at the client. In particular, during the decoding process the decoded slices may be rendered for display, wherein rendering includes generating screen slices (e.g. scanlines) from the decoded slices of a corresponding video frame, which are then streamed to a display of the client.

At 1140, the method includes begin displaying the one or more decoded slices that are rendered before fully receiving the one or more encoded slices at the client, in one embodiment. In particular, a decoded slice that has been placed into the display buffer may be immediately streamed to the display of the client. As such, the client operations of receive and display may be overlapped.

In another embodiment, the method includes begin displaying the one or more decoded slices that are rendered at the display before fully decoding the one or more encoded slices. In particular, a decoded slice that has been placed into the display buffer may be immediately streamed to the display of the client. As such, the client operations of decode and display may be overlapped.

Figure 12:
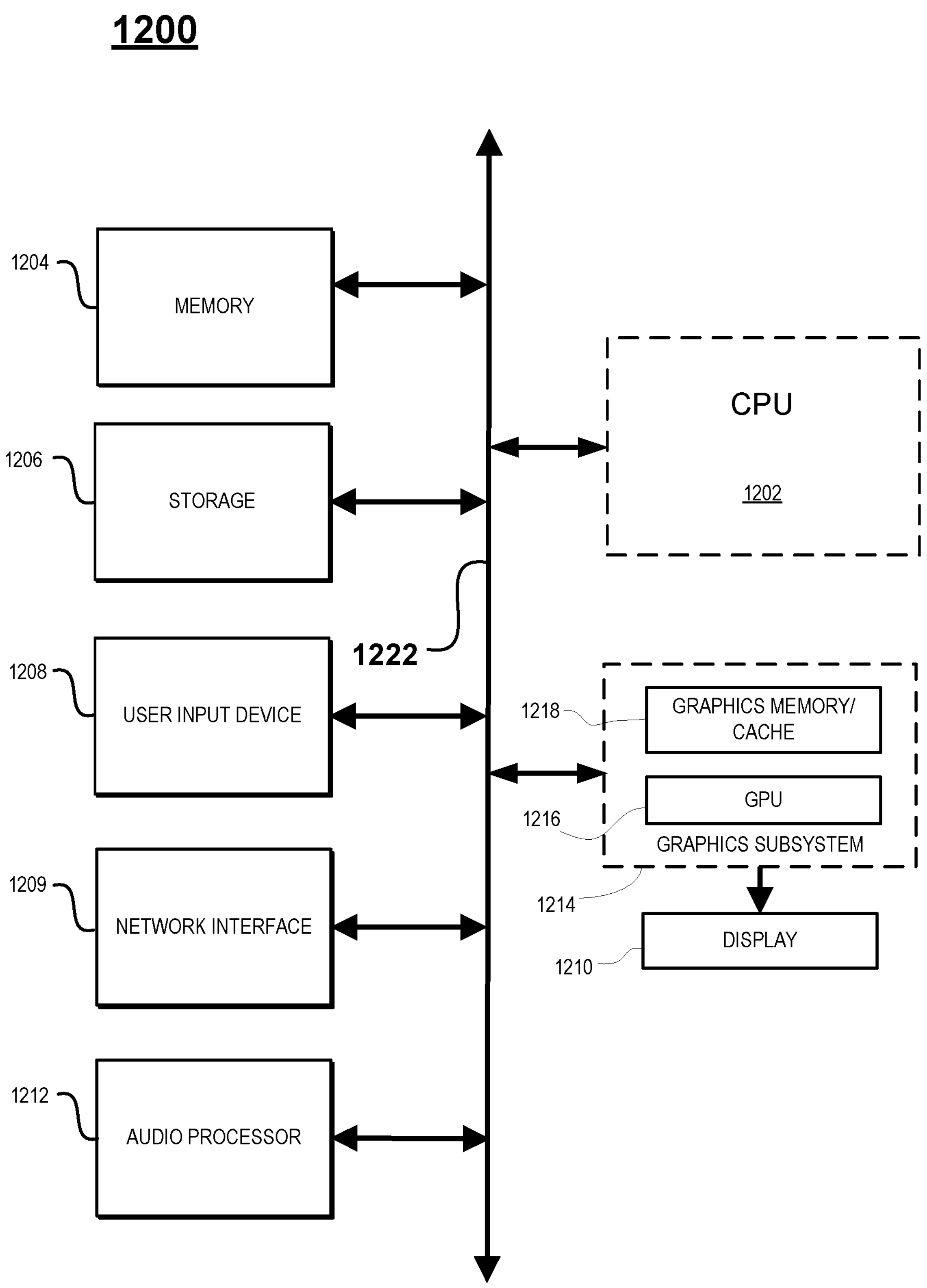
FIG. 12 illustrates components of an example device that can be used to perform aspects of the various embodiments of the present disclosure.

FIG. 12 illustrates components of an example device 1200 that can be used to perform aspects of the various embodiments of the present disclosure. For example, FIG. 12 illustrates an exemplary hardware system suitable for streaming media content and/or receiving streamed media content, including tuning a VSYNC signal of a server or client to synchronize and/or adjust the offset of VSYNC signals between a server and a client, for providing dynamic buffering on the client, and for overlapping decoding and displaying of video frames at the client, in accordance with embodiments of the present disclosure. This block diagram illustrates a device 1200 that can incorporate or can be a personal computer, a server computer, gaming console, mobile device, or other digital device, each of which is suitable for practicing an embodiment of the invention. Device 1200 includes a central processing unit (CPU) 1202 for running software applications and optionally an operating system. CPU 1202 may be comprised of one or more homogeneous or heterogeneous processing cores.

In accordance with various embodiments, CPU 1202 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

Memory 1204 stores applications and data for use by the CPU 1202 and GPU 1216. Storage 1206 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1208 communicate user inputs from one or more users to device 1200, examples of which may include keyboards, mice, joysticks, touch pads, touch screens, still or video recorders/cameras, and/or microphones. Network interface 1209 allows device 1200 to communicate with other computer systems via an electronic communications network, and may include wired or wireless communication over local area networks and wide area networks such as the internet. An audio processor 1212 is adapted to generate analog or digital audio output from instructions and/or data provided by the CPU 1202, memory 1204, and/or storage 1206. The components of device 1200, including CPU 1202, graphics subsystem 1214 including GPU 1216 and GPU cache 1218, memory 1204, data storage 1206, user input devices 1208, network interface 1209, and audio processor 1212 are connected via one or more data buses 1222.

A graphics subsystem 1214 is further connected with data bus 1222 and the components of the device 1200. The graphics subsystem 1214 includes a graphics processing unit (GPU) 1216 and graphics memory 1218. Graphics memory 1218 includes a display memory (e.g., a frame buffer) used for storing pixel data for each pixel of an output image. Graphics memory 1218 can be integrated in the same device as GPU 1216, connected as a separate device with GPU 1216, and/or implemented within memory 1204. Pixel data can be provided to graphics memory 1218 directly from the CPU 1202. Alternatively, CPU 1202 provides the GPU 1216 with data and/or instructions defining the desired output images, from which the GPU 1216 generates the pixel data of one or more output images. The data and/or instructions defining the desired output images can be stored in memory 1204 and/or graphics memory 1218. In an embodiment, the GPU 1216 includes 3D rendering capabilities for generating pixel data for output images from instructions and data defining the geometry, lighting, shading, texturing, motion, and/or camera parameters for a scene. The GPU 1216 can further include one or more programmable execution units capable of executing shader programs.

The graphics subsystem 1214 periodically outputs pixel data for an image from graphics memory 1218 to be displayed on display device 1210, or to be projected by a projection system (not shown). Display device 1210 can be any device capable of displaying visual information in response to a signal from the device 1200, including CRT, LCD, plasma, and OLED displays. Device 1200 can provide the display device 1210 with an analog or digital signal, for example.

Other embodiments for optimizing the graphics subsystem 1214 could include multi-tenancy GPU operations where a GPU instance is shared between multiple applications, and distributed GPUs supporting a single game. The graphics subsystem 1214 could be configured as one or more processing devices.

For example, the graphics subsystem 1214 may be configured to perform multi-tenancy GPU functionality, wherein one graphics subsystem could be implementing graphics and/or rendering pipelines for multiple games, in one embodiment. That is, the graphics subsystem 1214 is shared between multiple games that are being executed.

In other embodiments, the graphics subsystem 1214 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, the present disclosure describes methods and systems configured for streaming media content and/or receiving streamed media content, including tuning a VSYNC signal of a server or client to synchronize and/or adjust the offset of VSYNC signals between a server and a client, for providing dynamic buffering on the client, and for overlapping decoding and displaying of video frames at the client.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:

setting, at a server, a server VSYNC signal to a server VSYNC frequency, the server VSYNC signal corresponding to generation of a plurality of video frames at the server during a plurality of frame periods for the server VSYNC frequency;

setting, at a client, a client VSYNC signal to a client VSYNC frequency;

sending a plurality of compressed video frames based on the plurality of video frames from the server to the client over a network using the server VSYNC signal;

decoding and displaying, at the client, the plurality of compressed video frames; and as the client receives the plurality of compressed video frames, analyzing the timing of one or more client operations to adjust a relative timing between the server VSYNC signal and the client VSYNC signal.

2. The method of claim 1, further comprising:

sending timestamp information associated with the plurality of video frames that is generated from the server to the client.

3. The method of claim 2, wherein the timestamp information is sent with the plurality of compressed video frames or the timestamp information is sent separate from the plurality of compressed video frames.

4. The method of claim 2, wherein the timestamp information includes a corresponding timestamp for a corresponding video frame that is generated, wherein the corresponding timestamp occurs at a corresponding flip-time at the server or at a corresponding occurrence of the server VSYNC signal used for scanning the corresponding video frame to an encoder.

5. The method of claim 2, further comprising:

based on the timestamp information sent from the server to the client, adjusting at least one of the server VSYNC frequency and the client VSYNC frequency to be similar.

6. The method of claim 2, further comprising:

based on the timestamp information sent from the server to the client, adjusting a relative phase or an offset between the server VSYNC signal and the client VSYNC signal.

7. The method of claim 1, further comprising:

adjusting the relative timing by adjusting at least one of the server VSYNC signal and the client VSYNC signal.

8. The method of claim 7, further comprising, determining, at the server or the client, a drift between the server VSYNC frequency and the client VSYNC frequency; and adjusting, at the server or the client, the server VSYNC frequency or the client VSYNC frequency for one or more frame periods to compensate for the drift.

9. The method of claim 7, wherein the adjusting at least one of the server VSYNC signal and the client VSYNC signal includes:

removing or adding a raster scanline for a vertical blanking interval of a frame period of the server VSYNC signal or the client VSYNC signal.

10. The method of claim 7, wherein the adjusting at least one of the server VSYNC signal and the client VSYNC signal includes:

overclocking or underclocking a corresponding clock of the server or the client.

11. The method of claim 1, further comprising:

analyzing timing of the one or more client operations continuously; and dynamically adjusting the relative timing by adjusting at least one of the server VSYNC signal and the client VSYNC signal, based on the analysis.

12. The method of claim 1, wherein the server includes an encoder for producing the plurality of compressed video frames, the plurality of compressed video frames generated responsive to processing of an application by the server in a streaming mode and delivered to the client during a session.

13. The method of claim 12, wherein the client is configured to receive and decompress the plurality of compressed video frames for rendering to a display that is associated with the client.

14. The method of claim 1, wherein timing of the decoding by the client of the plurality of compressed video frames is analyzed and used to adjust the relative timing between the server VSYNC signal and the client VSYNC signal.

15. The method of claim 14, further comprising, analyzing the timing of the decoding by the client of a plurality of encoded slices within the plurality of compressed video frames to adjust the relative timing between the server VSYNC signal and the client VSYNC signal.

16. The method of claim 14, wherein a near-worst case decode time of the plurality of compressed video frames is analyzed to adjust the relative timing between the server VSYNC signal and the client VSYNC signal.

17. The method of claim 16, wherein the near-worst case decode time is determined by measuring a distribution of decode times of the plurality of compressed video frames received at the client.

18. The method of claim 1, further comprising:

providing a corresponding timestamp at the server for each of the plurality of video frames that is generated at a corresponding scan-out of the corresponding video frame to an encoder;

delivering a plurality of corresponding timestamps for the plurality of video frames to the client;

building a histogram giving timing for each of the plurality of video frames that is generated and delivered to the client of a corresponding decode time at the client relative to the corresponding timestamp provided at the server; and offsetting the client VSYNC signal from the server VSYNC signal so that a threshold percentage of the plurality of compressed video frames arrive at the client and are decoded in time for display at corresponding occurrences of the client VSYNC signal indicated by the corresponding timestamps.

19. A method, comprising:

generating a plurality of video frames at a server during a plurality of frame periods where frame periods in the plurality of frame periods are approximately equal in size;

setting, at a client, a client VSYNC signal to a client VSYNC frequency;

sending from the server to the client a plurality of compressed video frames based on the plurality of video frames;

decoding and displaying, at the client, the plurality of compressed video frames; and as the client receives the plurality of compressed video frames, analyzing timing of one or more client operations to adjust a relative timing of the client VSYNC signal and generation of each of the plurality of compressed video frames at the server.

20. The method of claim 19, further comprising:

periodically sending timestamp information related to the plurality of frame periods from the server to the client.

21. The method of claim 19, further comprising, determining, at the server or the client, a drift between a server VSYNC frequency and the client VSYNC frequency; and adjusting, at the server or client, the server VSYNC frequency or the client VSYNC frequency for one or more frame periods to compensate for the drift.

22. The method of claim 21, wherein the adjusting the server VSYNC frequency or the client VSYNC frequency includes:

removing or adding a raster scanline for a vertical blanking interval of a frame period of the server VSYNC signal or the client VSYNC signal.

23. The method of claim 21, wherein the adjusting the server VSYNC frequency or the client VSYNC frequency includes:

overclocking or underclocking a clock of the server or the client.

24. A non-transitory computer-readable medium storing a computer program for performing a method, the computer-readable medium comprising:

program instructions for setting, at a server, a server VSYNC signal to a server VSYNC frequency, the server VSYNC signal corresponding to generation of a plurality of video frames at the server during a plurality of frame periods for the server VSYNC frequency;

program instructions for setting, at a client, a client VSYNC signal to a client VSYNC frequency;

program instructions for sending a plurality of compressed video frames based on the plurality of video frames from the server to the client over a network using the server VSYNC signal;

program instructions for decoding and displaying, at the client, the plurality of compressed video frames; and program instructions for analyzing timing of one or more client operations to adjust a relative timing between the server VSYNC signal and the client VSYNC signal, as the client receives the plurality of compressed video frames.

25. The non-transitory computer-readable medium of claim 24, further comprising:

program instructions for sending timestamp information associated with the plurality of video frames that is generated from the server to the client, wherein the timestamp information includes a corresponding timestamp for a corresponding video frame that is generated, wherein the corresponding timestamp occurs at a corresponding flip-time at the server or at a corresponding occurrence of the server VSYNC signal used for scanning the corresponding video frame to an encoder.

26. The non-transitory computer-readable medium of claim 25, further comprising:

program instructions for adjusting at least one of the server VSYNC frequency and the client VSYNC frequency to be similar, based on the timestamp information sent from the server to the client.

27. The non-transitory computer-readable medium of claim 24, further comprising:

program instructions for adjusting a relative phase or an offset between the server VSYNC signal and the client VSYNC signal, based on the timestamp information sent from the server to the client.

28. The non-transitory computer-readable medium of claim 24, further comprising:

program instructions for adjusting the relative timing by adjusting at least one of the server VSYNC signal and the client VSYNC signal.

29. The non-transitory computer-readable medium of claim 28, further comprising:

program instructions for determining, at the server or the client, a drift between the server VSYNC frequency and the client VSYNC frequency; and program instructions for adjusting, at the server or the client, the server VSYNC frequency or the client VSYNC frequency for one or more frame periods to compensate for the drift.

30. The non-transitory computer-readable medium of claim 28, wherein the program instructions for adjusting at least one of the server VSYNC signal or the client VSYNC signal includes:

program instructions for removing or adding a raster scanline for a vertical blanking interval of a frame period of a corresponding server VSYNC signal or client VSYNC signal.

31. The non-transitory computer-readable medium of claim 28, wherein the program instructions for adjusting at least one of the server VSYNC signal or the client VSYNC signal includes:

program instructions for overclocking or underclocking a clock of the server or the client.

* * * * *